US011432461B2

(12) United States Patent
Steiner et al.

(10) Patent No.: US 11,432,461 B2
(45) Date of Patent: Sep. 6, 2022

(54) WIDE AREA MOWER DECK WITH OPEN-BOX STRUCTURE

(71) Applicant: Venture Products, Inc., Orville, OH (US)

(72) Inventors: Roy I. Steiner, Dalton, OH (US); Jeffrey C. Liggett, North Lawrence, OH (US); Corey Gerber, Smithville, OH (US)

(73) Assignee: Venture Products, Inc., Orrville, OH (US)

( * ) Notice: Subject to any disclaimer, the term of this patent is extended or adjusted under 35 U.S.C. 154(b) by 348 days.

(21) Appl. No.: 16/857,939

(22) Filed: Apr. 24, 2020

(65) Prior Publication Data
US 2021/0329833 A1    Oct. 28, 2021

(51) Int. Cl.
| *A01D 75/30* | (2006.01) |
| *A01D 34/86* | (2006.01) |
| *A01D 34/81* | (2006.01) |
| *A01D 34/66* | (2006.01) |
| *A01D 34/49* | (2006.01) |
| *A01D 34/52* | (2006.01) |
| *A01D 101/00* | (2006.01) |

(52) U.S. Cl.
CPC .............. *A01D 34/81* (2013.01); *A01D 34/49* (2013.01); *A01D 34/52* (2013.01); *A01D 34/66* (2013.01); *A01D 34/86* (2013.01); *A01D 75/306* (2013.01); *A01D 2101/00* (2013.01)

(58) Field of Classification Search
CPC combination set(s) only.
See application file for complete search history.

(56) References Cited

U.S. PATENT DOCUMENTS

| 3,729,910 | A | * | 5/1973 | Hardee | A01D 34/86 56/11.9 |
| 4,502,271 | A | * | 3/1985 | Hansen | A01D 34/66 56/13.6 |
| 5,005,344 | A | * | 4/1991 | McCracken | A01D 34/63 56/14.7 |
| 5,241,808 | A | * | 9/1993 | Colistro | A01D 75/30 56/6 |
| 5,657,620 | A | * | 8/1997 | Thagard | A01D 34/64 56/320.1 |
| 8,393,136 | B1 | * | 3/2013 | Fraley | A01D 34/64 56/320.1 |
| 9,756,782 | B2 | * | 9/2017 | Andre | A01D 34/71 |

(Continued)

*Primary Examiner* — Adam J Behrens
(74) *Attorney, Agent, or Firm* — Sand, Sebolt & Wernow Co., LPA

(57) ABSTRACT

A wide area mower with an open-box structure mower deck. The deck has a width from the left to right side of about 72 to 120 inches. The deck's length is about 24 to 70 inches. A left and right front wheel are positioned in front of the deck. The wide mower deck will flex, twist, or bend when one of the left or right wheels travels over uneven terrain while the rest of the mower travels over substantially level terrain. A cutting height adjustment mechanism is provided on the mower that allows an operator to raise or lower an entire left side or an entire right side of the mower deck to a selected cutting height. This is done simply by disengaging a locking mechanism and manipulating a lever on a four-bar linkage attached to each side of the deck and then re-engaging the locking mechanism.

19 Claims, 21 Drawing Sheets

(56) References Cited

U.S. PATENT DOCUMENTS

| | | | |
|---|---|---|---|
| 2005/0198933 A1* | 9/2005 | Klein | G06Q 30/0201 |
| | | | 56/320.1 |
| 2009/0205306 A1* | 8/2009 | Foster, III | A01D 34/81 |
| | | | 56/13.6 |
| 2014/0059991 A1* | 3/2014 | Dixon | A01D 34/866 |
| | | | 56/10.7 |
| 2014/0075913 A1* | 3/2014 | Walker | A01D 34/81 |
| | | | 56/320.1 |
| 2017/0208741 A1* | 7/2017 | Carlson | A01D 34/76 |
| 2020/0281117 A1* | 9/2020 | Smeets | A01D 34/71 |

* cited by examiner

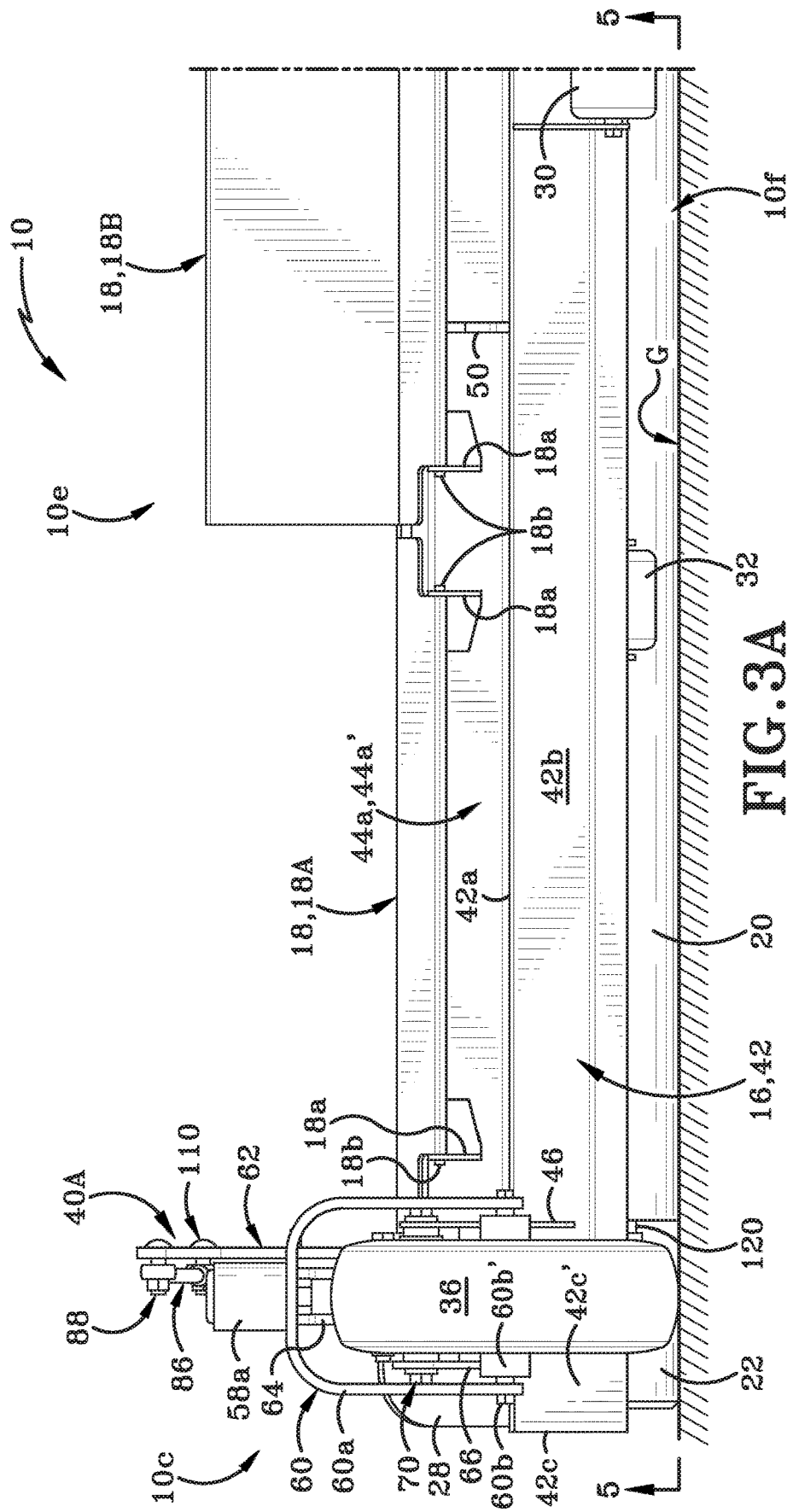

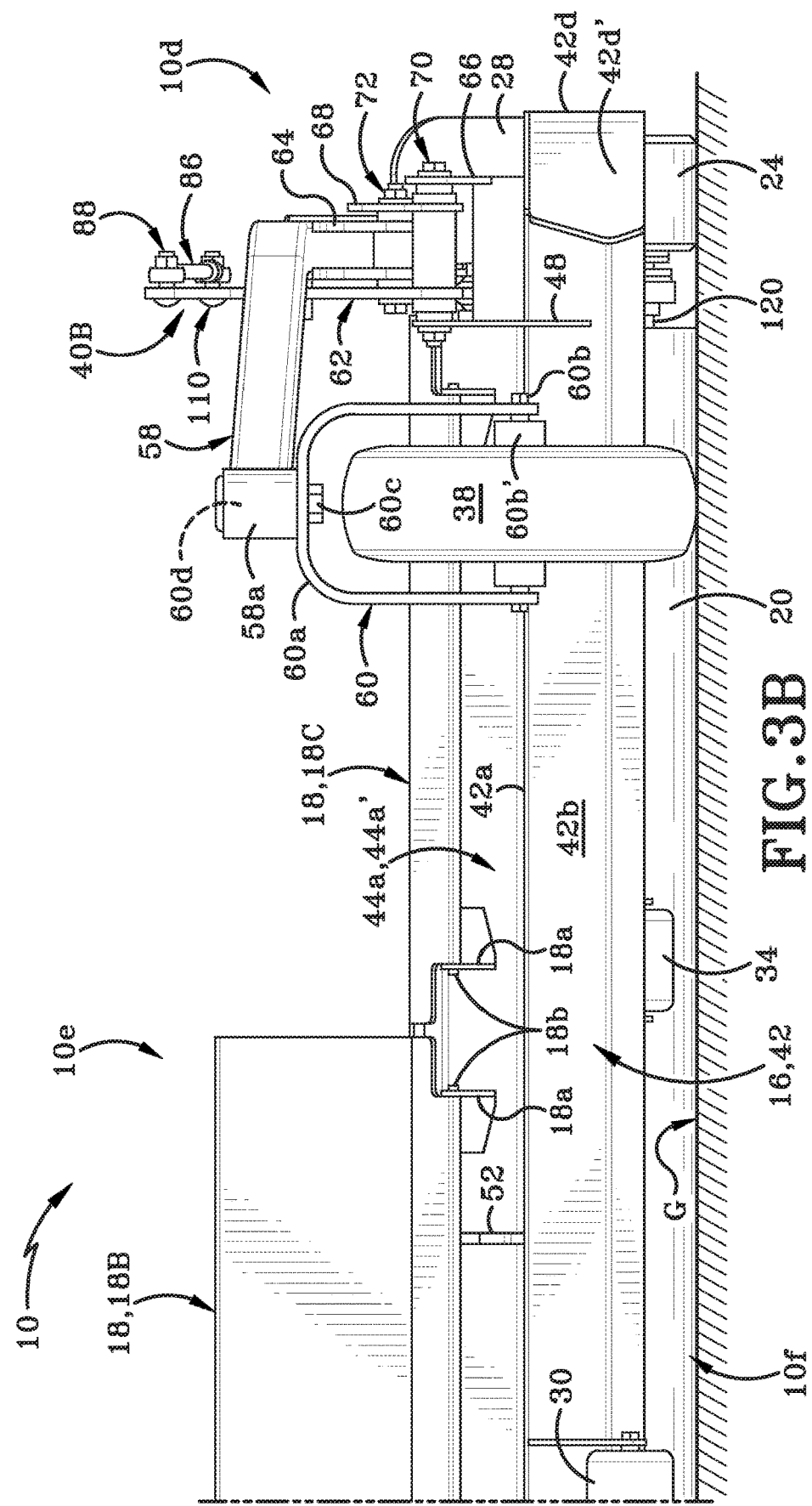

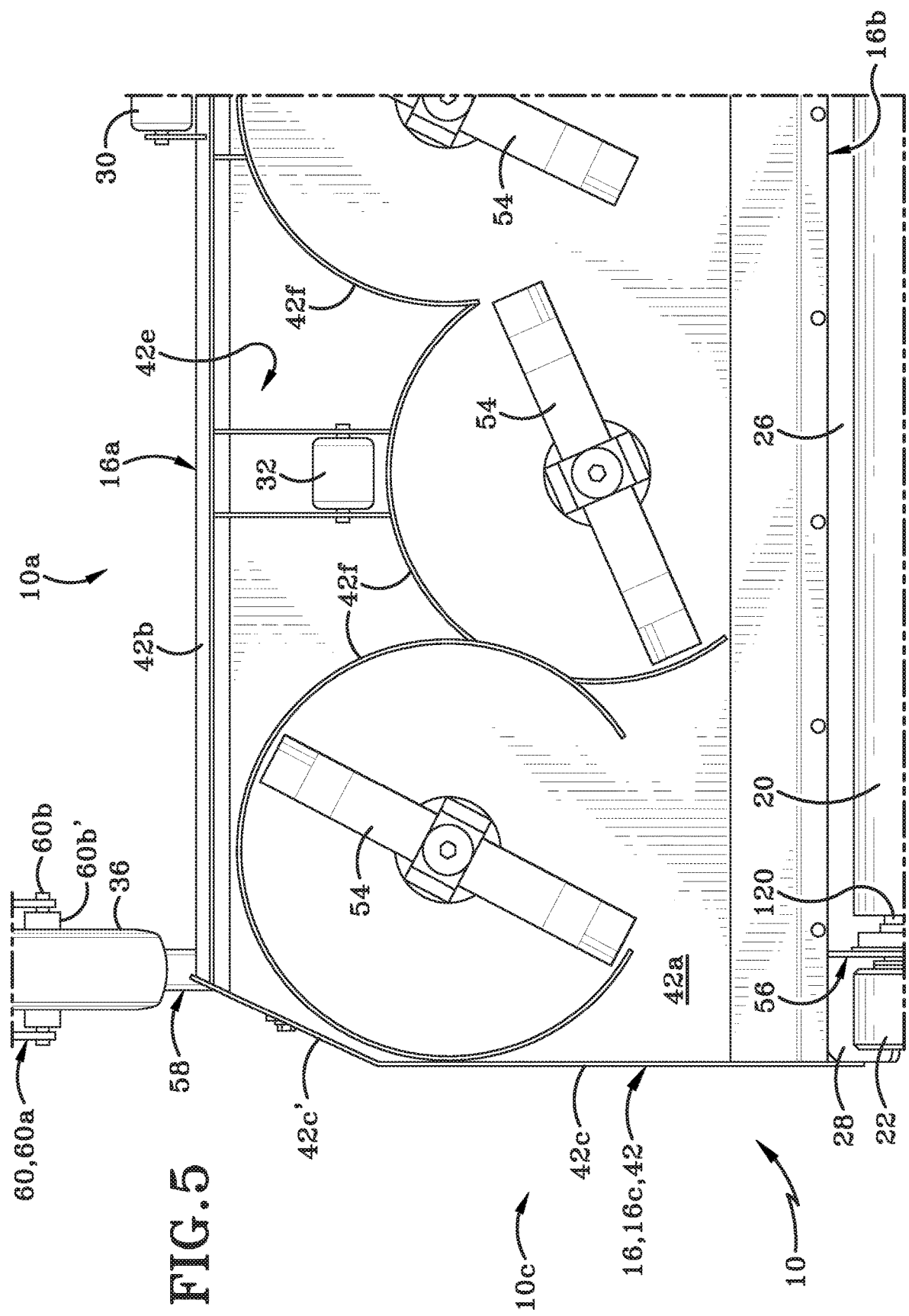

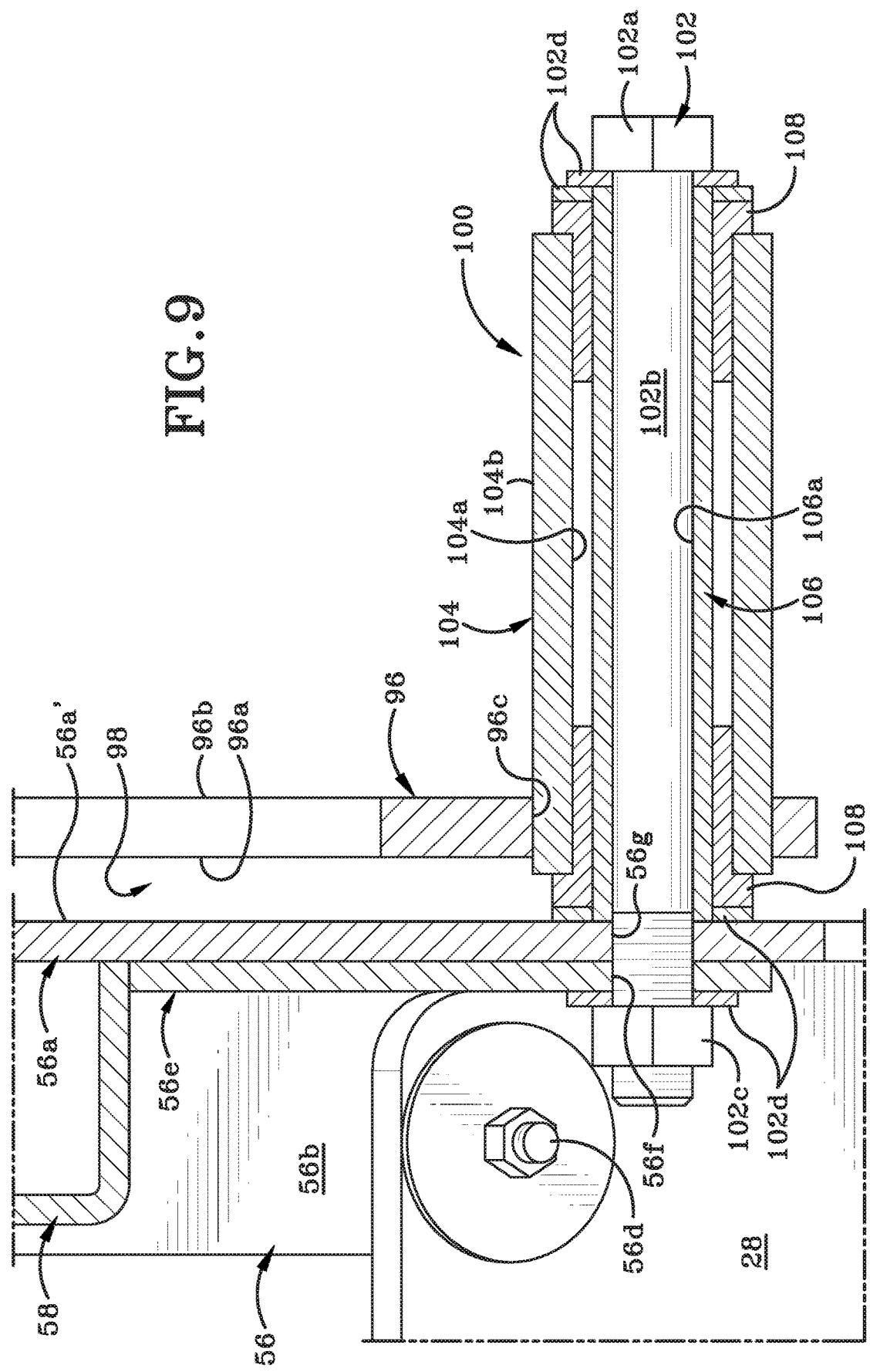

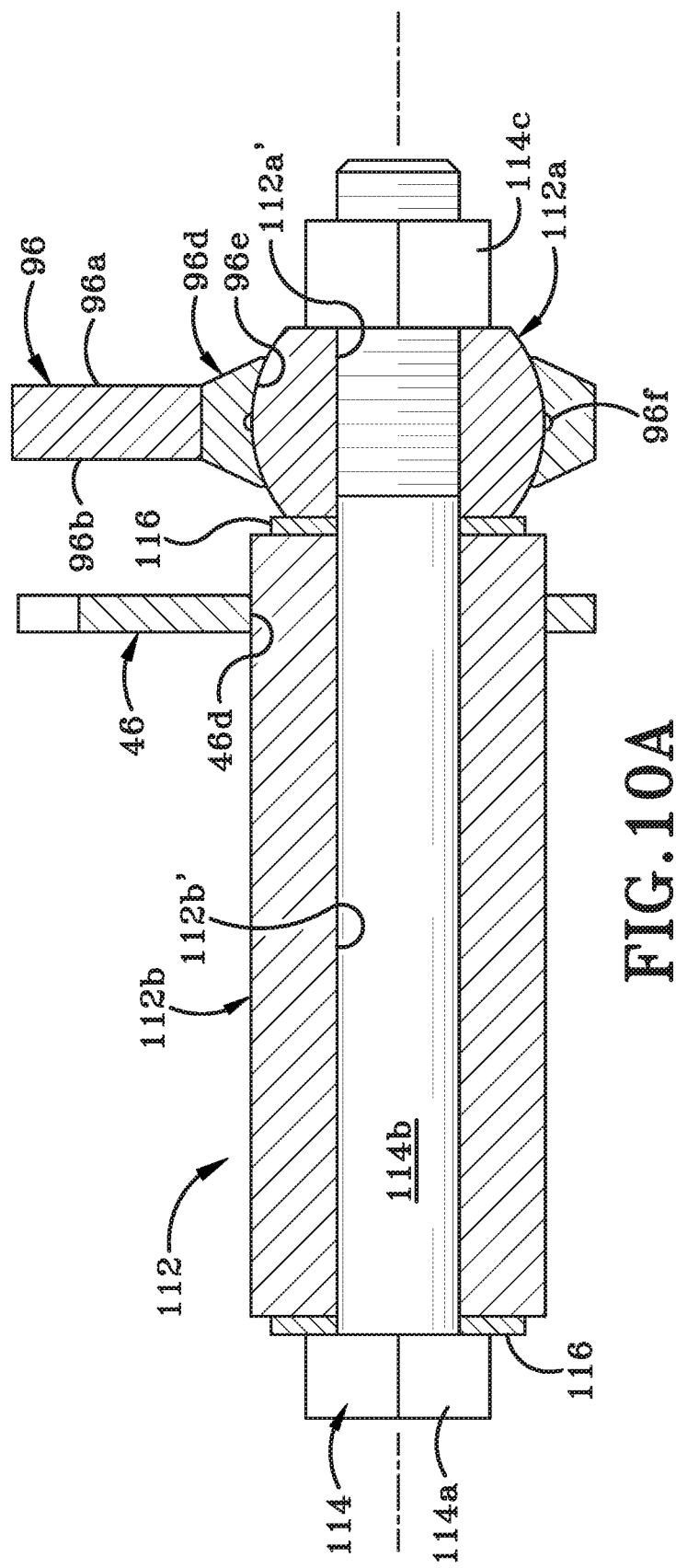

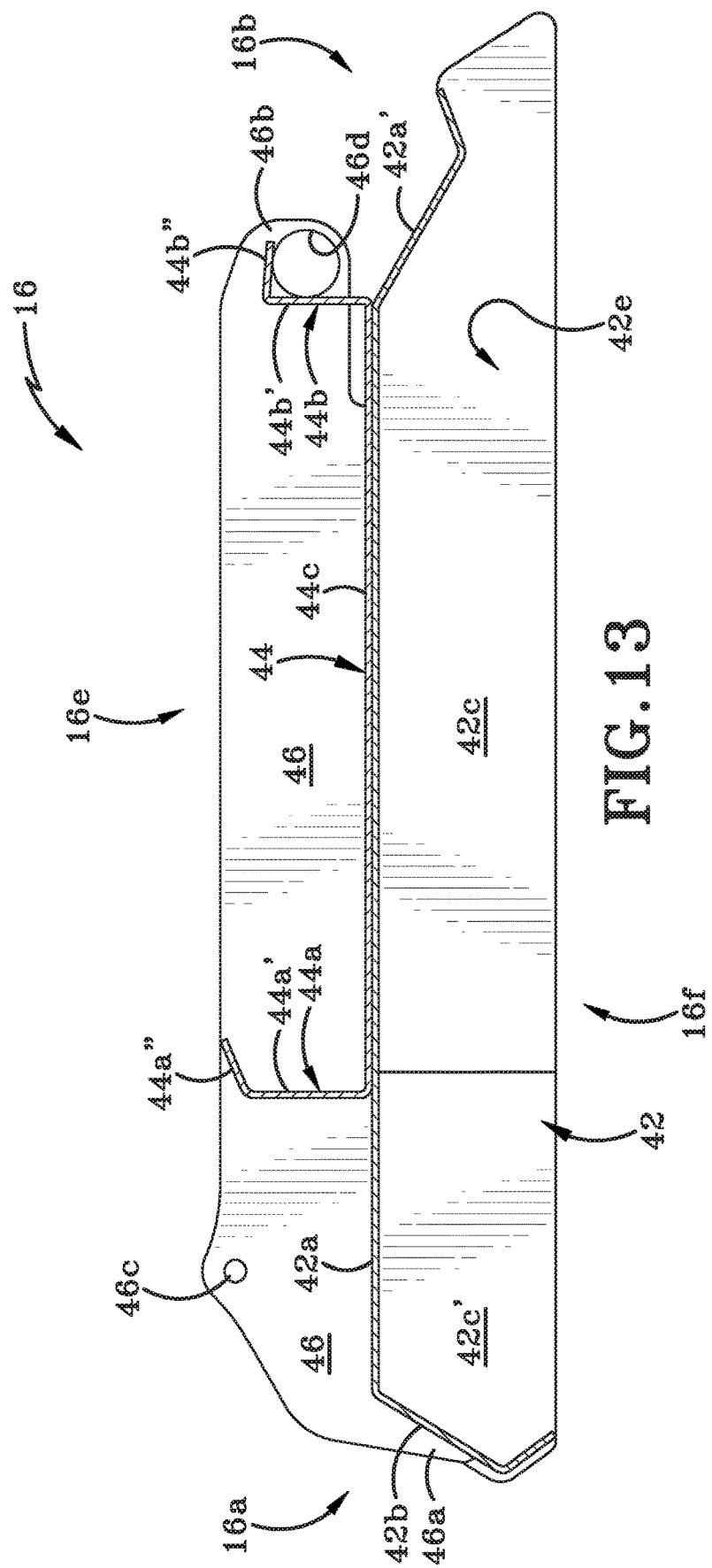

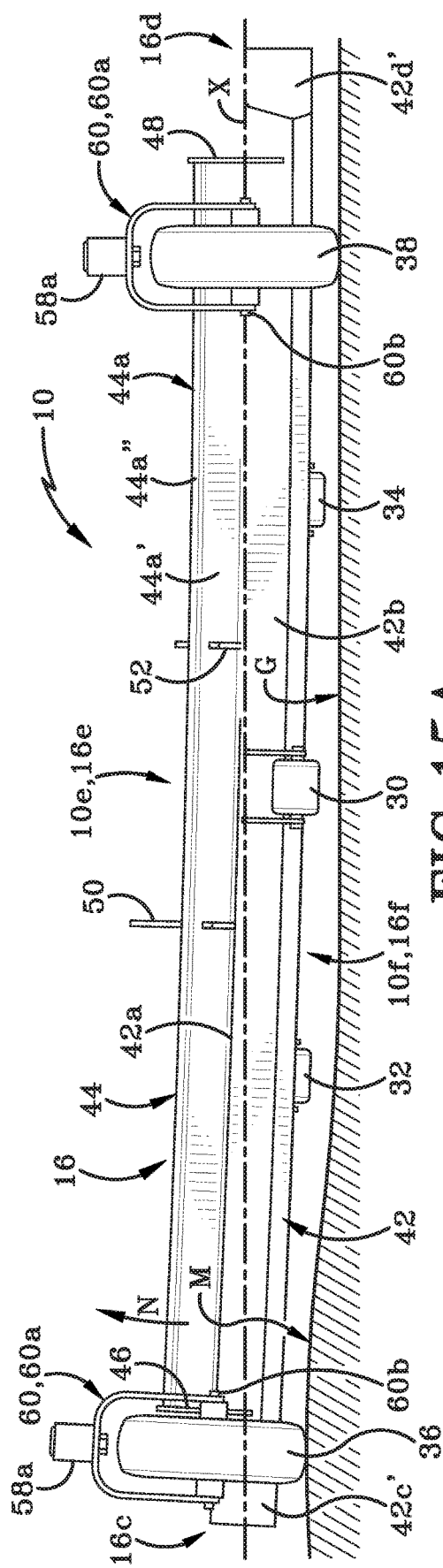
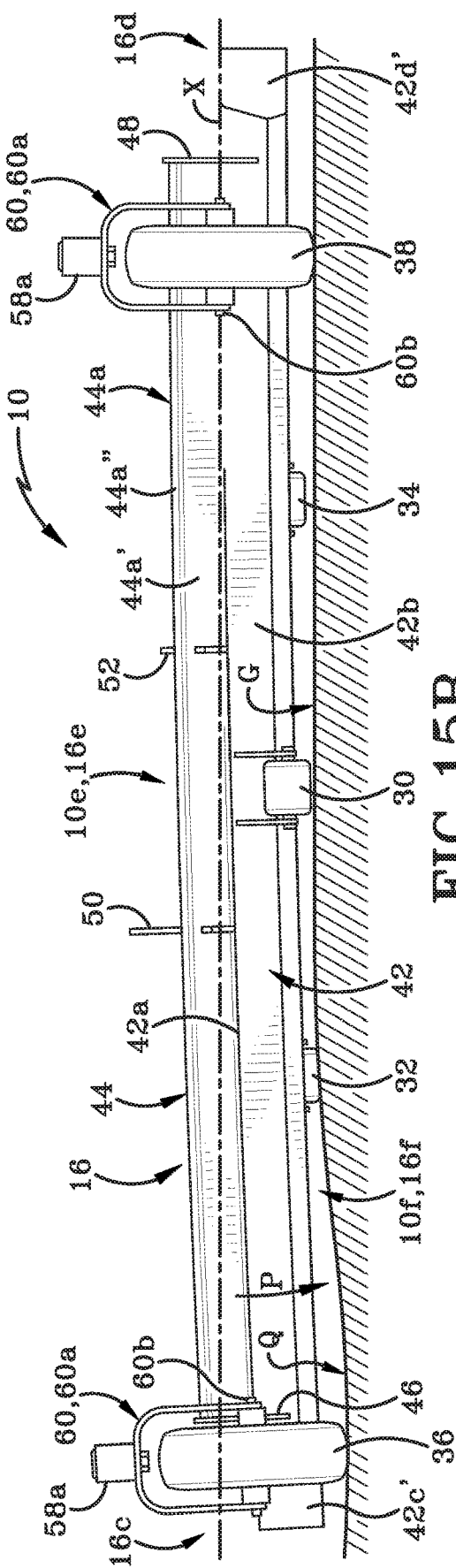
FIG.15A
FIG.15B

WIDE AREA MOWER DECK WITH OPEN-BOX STRUCTURE

TECHNICAL FIELD

This disclosure is directed to landscaping equipment. In particular, this disclosure relates to mowers for cutting grass, particularly regularly maintained grass. Specifically, this disclosure is directed to a mower having a wide area mower deck an open-box structure that is capable of flexing, bending, or twisting in response to changes in land contour, and so that the mower can mow grass without tending to scalp the same. The mower also includes a cutting height adjustment mechanism for raising and lowering the entire left and right sides of a mower deck without using tools by simply manipulating a lever on a four-bar linkage system provided on each side of the mower deck.

BACKGROUND

Background Information

Municipalities, athletic facilities, and golf courses, amongst others, often have large, wide open areas of grass that have to be regularly cut and maintained. These grassy areas are often generally flat or have small hills that may not be particularly steep. Because of the size of these grassy areas, it can take a long time for a landscaping company or groundskeeper to mow these areas. It is therefore not uncommon for the landscaping company or groundskeeper to try and utilize a mower with a large cut width as this can help reduce the time taken to mow these wide-open areas.

One of the problems that faces operators of such large cut width mowers is that the terrain upon which the grass grows can include small bumps and hollows that may not be immediately obvious to the operator. This is obviously less common on athletic fields but can be an issue in parks and on golf courses. As these mowers negotiate the changes in the terrain, they will either tilt in a first direction so that some grass is not cut by the mower, or they will tilt in another direction and scalp the grass. This can happen regardless of whether or mower's wheels are riding over a bump or into a depression.

All mowers come with some type of mechanism for enabling an operator to adjust the cut height of the mower's blades. In mowers that are capable of making wider cuts, the height adjustment mechanisms typically have to be adjusted utilizing tools. Like their smaller cut width counterparts, each height adjustment mechanism only adjusts the height of one of the four corners of the mower deck. Setting the cut height for the mower deck is therefore a somewhat time consuming procedure that just adds to the overall time required to cut the large open areas of grass. This additional time required for height setting is particularly problematic at locations, such as golf courses, where the groundskeeper may have to select a first cut height for the greens and a second cut height for the fairways.

SUMMARY

The mower of the present disclosure has been developed to address these issues with prior art mowers. The mower of the present disclosure provides a cut-width of about eight feet long, the cutting height adjustment mechanism provided thereon can be quickly and easily adjusted without the use of tools. The adjustment mechanism comprises a first assembly that is used to raise or lower a right side of the mower deck and a second assembly that is used to raise or lower a left side of the mower deck. The mower deck itself is configured to allow part of the deck to ride over a bump or into a depression but keeps the rest of the mower in contact with the flat terrain. This is possible because the open-box deck construction allows the deck to flex, bend, or tilt as one part of the deck is lifted or drops down into a hollow. The mower is also provided with anti-scalp rollers that keep the mower deck and thereby the mower blades at least a minimum distance off the ground and thereby reduce the possibility that the grass will be scalped by the mower.

A wide area mower with an open-box structure mower deck is disclosed herein. The deck has a width from the left to right side of from about 72 inches up to about 120 inches. The deck's length is from about 24 up to about 70 inches. A left and right front wheel are positioned in front of the deck. The wide mower deck will flex, twist, or bend when one of the left or right wheels travels over uneven terrain while the rest of the mower travels over substantially level terrain. A cutting height adjustment mechanism is provided on the mower that allows an operator to raise or lower an entire left side or an entire right side of the mower deck to a selected cutting height. The term "entire" as used herein denotes the left side region or the right side region of the mower deck that extends from a front end of the mower deck to a rear end of the mower deck, i.e., not just a front corner or a rear corner of the mower deck. Raising or lowering the entire left side or entire right side is accomplished simply by disengaging a locking mechanism and manipulating a lever on a four-bar linkage attached to each side of the deck and then re-engaging the locking mechanism.

In one aspect, an exemplary embodiment of the present disclosure may provide a mower comprising a mower deck; a right front wheel and left front wheel operatively engaged with the mower deck; and one or more mower blades positioned for rotation below the mower deck; wherein the mower deck is of an open-box structure that enables the mower deck to twist, flex, or bend when terrain over which the mower is traveling is uneven.

In one embodiment, the mower deck may be a single unarticulated mower deck. In one embodiment, the open-box structure of the mower deck may include a top wall having an upper surface, a lower surface, a first end, a second end, a first edge, and a second edge; at least one bar extending transversely across the top surface of the top wall in a direction from the first edge to the second edge. In one embodiment the at least one bar may comprise only a single plate and the single plate may be formed into an L-shape. In one embodiment the at least one bar may extend upwardly from the top surface of the top wall. In one embodiment, the mower deck may further comprise at least one rib extending longitudinally across the top surface of the top wall in a direction from the first end to the second end. In one embodiment the at least one rib may comprise a single plate. In one embodiment the at least one rib extends upwardly from the top surface of the top wall.

In one embodiment, the mower deck may further comprise at least one side wall extending longitudinally along the lower surface of the top wall in a direction from the first end to the second end. In one embodiment, the at least one side wall may be a single plate. In one embodiment the at least one side wall may extend downwardly from the lower surface of the top wall. In one embodiment, the mower deck may further comprise a front wall extending transversely along the lower surface of the top wall in a direction from the first edge to the second edge. In one embodiment the at least one side wall may include a left side wall and a right side wall, and the front wall may extend between front ends of the left side wall and the right side wall, and the mower may be free of any walls extending between rear ends of the left side wall and the right side wall.

In one embodiment, the mower may further include one or more anti-scalping rollers mounted to the mower deck and extending downwardly from a lower surface of a top wall thereof, and wherein the one or more anti-scalping rollers are adapted to only contact the terrain over which the mower travels when the mower deck twists, flexes, or bends downwardly toward the terrain. In one embodiment a width of the mower deck from a right side thereof to a left side thereof may be from about 72 inches up to about 120 inches.

In another aspect, an exemplary embodiment of the present disclosure may provide a method of mowing an area of grass comprising providing a mower that has a mower deck of an open-box structure; moving the mower deck across the area of grass to be mowed; cutting the grass with rotating mower blades mounted beneath a top wall of the mower deck; and flexing, twisting, or bending the mower deck when one of a pair of front wheels engaged with the mower deck travels over uneven terrain.

In one embodiment, the providing of the mower deck on the mower may comprise providing a single, non-articulating mower deck on the mower. In one embodiment the providing of the pair of wheels may include providing a right front wheel and a left front wheel, and the method may include rotating each of the right front wheel and left front wheel about an axle; maintaining the axle of the right front wheel and the axle of the left front wheel in a first plane when the mower travels over generally flat terrain; and moving the axle of one of the right front wheel and the left front wheel into a second plane when one of the right front wheel and the left front wheel travels over uneven terrain. In one embodiment, the method may further comprise providing one or more anti-scalping rollers on the mower deck and contacting the terrain with at least one of the one or more anti-scalping rollers when one of pair of rollers travels through a depression in the terrain. The method may further include maintaining the rotating mower blades a minimum distance above the terrain when the at least one of the one or more anti-scalping rollers contacts the terrain; and reducing a tendency of the rotating mower blades to scalp the grass.

In another aspect, and exemplary embodiment of the present disclosure may provide a mower comprising a mower deck having a right side and an opposed left side that each extend from a front end of the mower deck to a rear end thereof; one or more mower blades positioned for rotation below a top wall of the mower deck; and a cutting height adjustment mechanism operatively engaged with the mower deck, said cutting height adjustment mechanism being actuated to separately raise or lower one of the entire right side and entire left side of the mower deck relative to a terrain to be mowed.

In one embodiment, the mower may further comprise a locking mechanism operatively engaged with the cutting height adjustment mechanism, said locking mechanism being moveable between a locked position and an unlocked position, and when in the unlocked position, the mower deck is able to be raised or lowered, and when in the locked position, the mower deck is locked at a selected cutting height. In one embodiment, the cutting height adjustment mechanism may be actuated without using tools. In one embodiment, the cutting height adjustment mechanism comprises a first assembly operatively engaged with the right side of the mower deck; and a second assembly operatively engaged with the left side of the mower deck. In one embodiment, each of the first assembly and second assembly may comprise a four-bar linkage.

In another aspect, and exemplary embodiment of the present disclosure may provide a method of adjusting a height of a mower deck relative to a terrain to be mowed comprising selecting a grass cut height; disengaging a locking mechanism provided on a four-bar linkage that operatively engages one of a right side or a left side of a mower deck on a mower; performing one of moving a lever provided on the four-bar linkage in a first direction to the selected cut height to raise the one of the right side and the left side of the mower deck a first distance further away from the terrain; or moving the lever in a second direction to the selected cut height to lower the one of the right side and the left side of the mower deck a second distance closer to the terrain; and re-engaging the locking mechanism.

In one embodiment, the method may further comprise selecting the same grass cut height; disengaging a locking mechanism provided on a second four-bar linkage that operatively engages the other of the right side and the left side of a mower deck on a mower; performing the same one of moving a lever provided on the second four-bar linkage in the first direction to the same selected cut height to raise the other of the right side and the left side of the mower deck the first distance further away from the terrain; or moving the lever on the second four-bar linkage in the second direction to the same selected cut height to lower the other of the right side and the left side of the mower deck the second distance closer to the terrain; and re-engaging the locking mechanism on the second four-bar linkage. The method may further comprise mowing grass on the terrain with mower blades provided on the mower deck.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3A is a front elevation view of a right side half of the mower deck assembly of FIG. 1;

FIG. 3B is a front elevation view of a left side half of the mower deck assembly of FIG. 1;

FIG. 5 is a partial bottom plan view of the right side half of the mower deck assembly of FIG. 1 and it will be understood that the left side half of the mower deck assembly is a mirror image of FIG. 5;

FIG. 9 is a cross-section of the pivot assembly and other components associated with the rocker plate taken along line 9-9 of FIG. 2;

FIG. 10A is a cross-section of the connector mechanism for the rocker plate of the mower deck assembly taken along line 10A-10A of FIG. 2, with the figure showing the connector mechanism in a neutral position;

FIG. 13 is a longitudinal cross-section of the mower deck taken along line 13-13 of FIG. 12;

FIG. 15A is a front elevation view of the mower deck assembly taken along line 15A-15A of FIG. 14B with a number of components omitted for clarity of illustration; and FIG. 15B is a front elevation view of the mower deck assembly taken along line 15B-15B of FIG. 14C with a number of components omitted for clarity of illustration.

Similar numbers refer to similar parts throughout the drawings.

DETAILED DESCRIPTION

Figure 1:
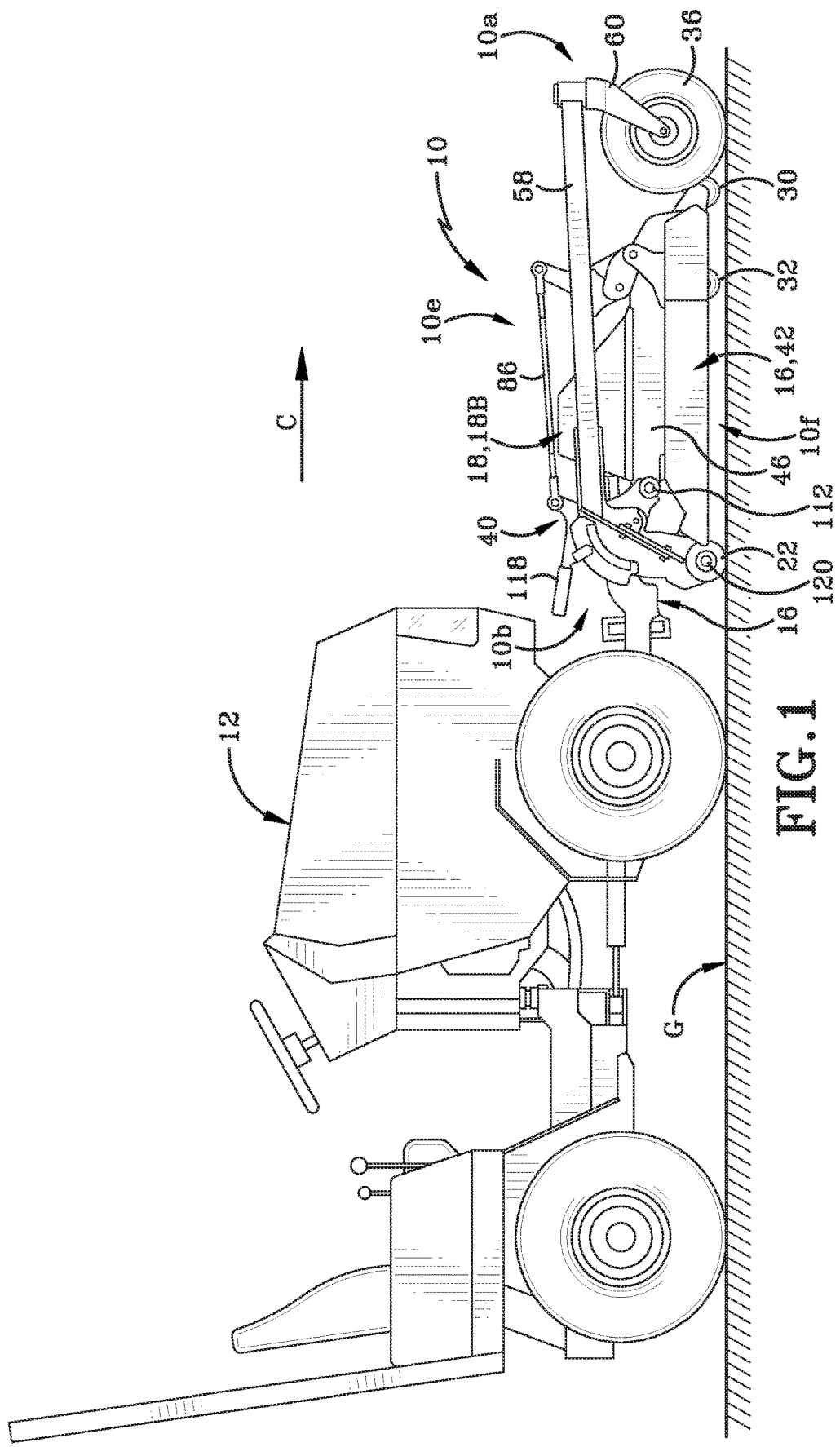
FIG. 1 is a right side elevation view of a tractor and a mower deck assembly in accordance with the present disclosure.

Referring to FIGS. 1-15B there is shown a mower 10 in accordance with the present disclosure. FIG. 1 shows mower 10 positioned in front of a tractor 12. Tractor 12 is representative of any powered utility vehicle that may be utilized to move mower 10 across the terrain "G". Mower 10 is a wide area mower that is particularly suitable for mowing grass on terrain "G" such as athletic fields, parks, large municipal lawns and other generally flat, open areas where the grass is regularly cut. Mower 10 is configured to be able to cut the grass in such areas faster than is possible with previously known mowers. Mower 10 is connected to tractor 12 by a hitch assembly 14 that includes a left hitch arm and a right hitch arm. Hitch assembly 14 further includes components that transfer power from tractor 12 to mower 10. The principles disclosed herewith with respect to mower 10 may be utilized regardless of the type of utility vehicle 12 with which the mower 10 is engaged.

Mower 10 has a front end 10a, a rear end 10b, a right side 10c (FIG. 3A), a left side 10d (FIG. 3B), a top 10e and a bottom 10f. Front end 10a and rear end 10b define a longitudinal direction therebetween. Right side 10c and left side 10d define a lateral direction therebetween. The lateral direction is oriented at right angles to the longitudinal direction. Top 10e and bottom 10f define a vertical direction therebetween. The vertical direction is at right angles to the longitudinal direction and to the lateral direction.

Figure 12:
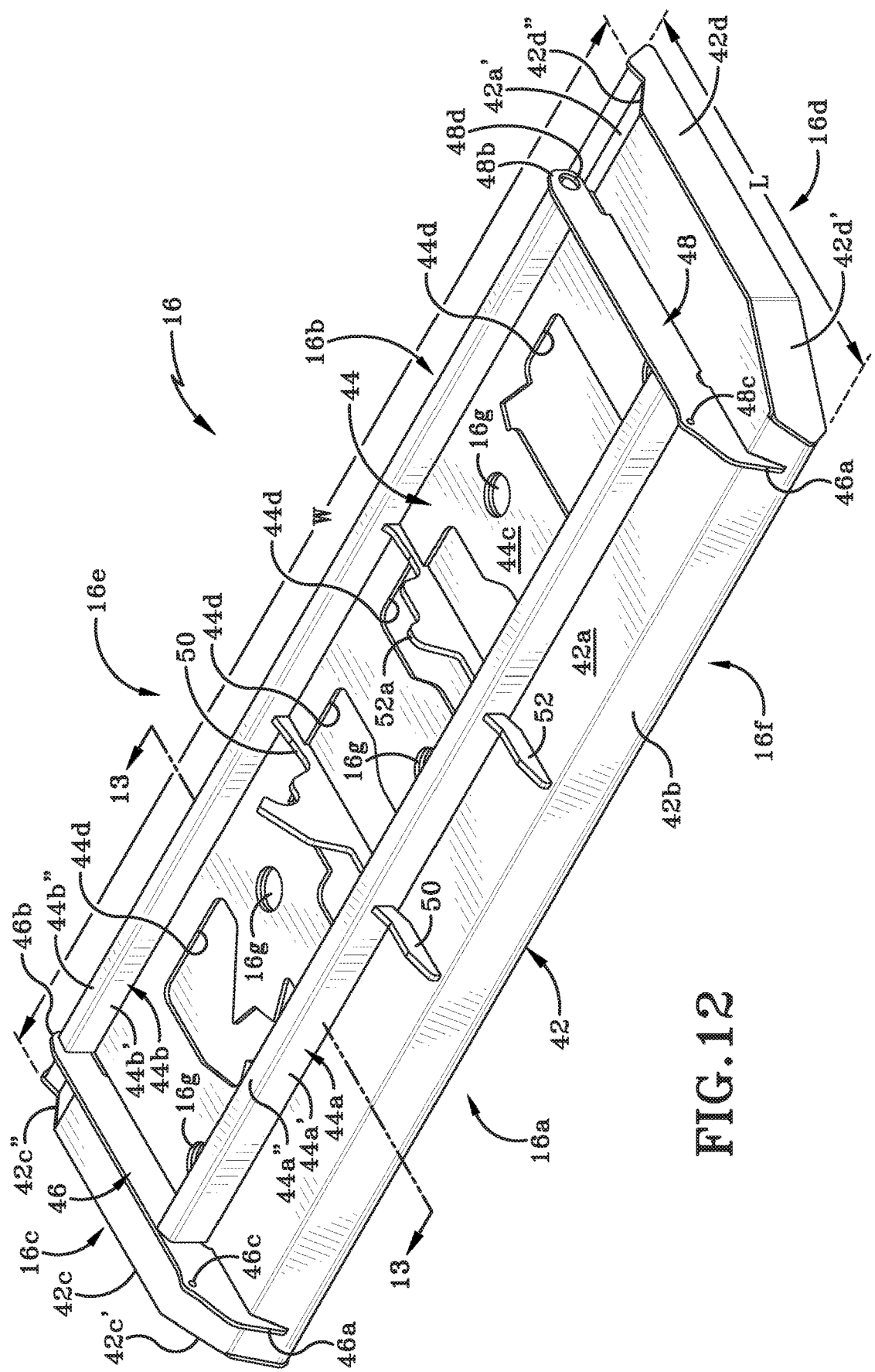
FIG. 12 is a top, front, isometric perspective view of the wide-bodied mower deck shown on its own.

Mower 10 includes a mower deck 16 that has an open-box structure. Mower deck 16 is a single, unarticulated mower deck. As best seen in FIGS. 12 and 13, mower deck 16 has a front end 16a, a rear end 16b, a right side 16c, a left side 16d, a top 16e, and a bottom 16f. Front end 16a of mower deck 16 is located proximate front end 10a of mower 10 and rear end 16b of mower deck 16 is located proximate rear end 10b of mower 10. Mower deck 16 may be mounted on hitch assembly 14 so as to be able to flip upwardly about an axis parallel to the rear end 16b of the deck and through ninety degrees. This ability to flip up helps to ensure that an operator is able to gain access to mower blades mounted on the underside of the mower deck 16 for maintenance and service purposes. One or more covers 18 are pivotally engaged with the mower deck 16. Mower deck 16 and covers 18 will be described in greater detail later herein.

Mower 10 includes a translation assembly provided proximate a rear end of mower deck 16. The translation assembly as illustrated comprises a striping roller 20 (FIGS. 3A, 4C, and 5), a right side roller 22 and left side roller 24 that are operably engaged with rear end 16b of mower deck 16. Right side roller 22 is located proximate a right end of striping roller 20 and left side roller 24 is located proximate a right end of striping roller 20. Right side roller 22, striping roller 20, and left side roller 24 are generally laterally aligned with each other. Striping roller 20 extends for substantially the entire width of mower deck 16. Striping roller 20 is fabricated from steel and may have a diameter of about four inches. When tractor 12 moves forwardly across the terrain "G", the weight of mower deck 16 is substantially carried by striping roller 20. Mower 10 is arranged as a rear discharge mower. A protective shield 26 (FIG. 6) is engaged with rear end 16b of mower deck 16 and extends over a top end of striping roller 20. A protective flap 28 is engaged with each of the right side 16c and left side 16d of mower deck 16. Flap 28 extends at least partially over the associated one of the right side roller 22 and left side roller 24. The protective shield 26 and flap 28 help to ensure that cuttings discharged from the rear end of the mower 10 will not accidentally be thrown up at the operator of tractor 12. Striping roller 20, right side roller 22, and left side roller 24 are substantially in constant contact with the terrain "G" when mower 10 is in use.

A center front roller 30, a right front roller 32, and a left front roller 34 are mounted on an underside of mower deck 16. Rollers 30, 32, and 34 are anti-scalp rollers that help ensure that the mower blades on mower deck 16 will be retained at least a minimum distance above the terrain "G". Center front roller 30 is located forwardly of front end 16a of mower deck 16 and forwardly of right front roller 32 and left front roller 34. Each of the right front roller 32 and left front roller 34 is mounted to bottom 16f of mower deck 16 and is positioned a distance laterally inward of right side 16c and left side 16*d* of mower deck 16, respectively. This arrangement of the rollers 30, 32, 34 can be seen in FIGS. 3A, and 3B. The rollers 30, 32, 34 may be adjustable in height in order to control how close to the terrain the mower blades may be brought. When the mower 10 is traveling over terrain that slopes in such a way that the bottom edge of the mower deck 16 moves closer to the terrain "G", one or more of the rollers 30, 32, 34 may contact the terrain "G" and thereby prevent any further downward movement of mower deck 16. Rollers 30, 32, 34 are therefore useful to maintain mower deck 16 at a predetermined or set minimum distance above the terrain "G". This arrangement helps to ensure that mower 10 will not scalp the grass it is cutting, even when the terrain is somewhat uneven.

In addition to the rollers 20, 22, 24, 30, 32, 34, mower 10 includes a right front wheel 36 and a left front wheel 38 (FIG. 3B) that are each operably engaged with mower deck 16 via a cutting height adjustment mechanism 40 (hereafter "adjustment mechanism 40"). Wheels 36, 38 are offset caster wheels that are positioned forwardly of front end 16*a* of mower deck 16 and forwardly of center front roller 30. Right front wheel 36 and left front wheel 38 effectively form the front end 10*a* (or leading end) of mower 10. As is evident from FIG. 2, the diameter of right and left front wheels 36, 38 is substantially greater than the diameter of any of the rollers 20, 22, 24, 30, 32, and 34. The larger diameter of right and left front wheels 36, 38 helps to ensure that the wheels are able to more easily travel over the terrain "G".

Adjustment mechanism 40 is utilized to raise or lower mower deck 16 relative to the terrain "G" and to lock the mower deck 16 at a desired cutting height. The various components of adjustment mechanism 40 will be described in greater detail hereafter. The adjustment mechanism 40 allows for hands-free adjustment of the height of the mower deck 16 relative to the terrain "G". In one embodiment, the adjustment mechanism 40 allows mower deck 16 to be adjusted to cut grass at a cut height of from about 1 inch up to about 5 inches.

Before discussing the adjustment mechanism 40 utilized to secure right and left front wheels 36, 38 to mower deck 16, the mower deck 16 will be described, in further detail, particularly with reference to FIGS. 5, 6, 12, and 13. Mower deck 16 is of an "open-box", "wide-bodied" construction. FIG. 12 shows that mower deck 16 is of a width "W" measured from right side 16*c* to left side 16*d*, and is of a length "L" measured between front end 16*a* and rear end 16*b*. For example, wherein the mower deck 16 may be of a width "W" of from about 72 inches up to about 120 inches and of a length "L" of from about 24 inches up to about 70 inches. In one particular embodiment, for example, the width "W" is about 96 inches and the length "L" is about 61 inches. This particular configuration gives the mower 10 a cut width of about 95 inches.

As shown in FIGS. 12 and 13, mower deck 16 comprises a body 42 that is of an open-box structure. Body 42 has a top wall 42*a* that has an upper surface and a lower surface. As will be discussed hereafter, a number of strengthening members are provided on the upper surface of top wall 42*a* and a number of other strengthening members are provided on the lower surface of the top wall. Each of these strengthening members (on the upper and lower surfaces) is fabricated from a single plate or sheet of metal. Some of these plates of metal are substantially straight along their length. Others of the plates of metal have a bend formed in them. In particular, some of the plates of metal are formed into an L-shape with an angle between a first leg and a second leg thereof. None of the plates of metal are formed into beams that are rectangular in cross-section. Furthermore, none of the strengthening members is solid in cross-section. Still further, none of the strengthening members defines an interior cavity or bore. This open-box structure results in a mower deck 16 that is not substantially rigid. If the mower deck 16 were rigid, then the front end 16*a*, back end 16*b*, right side 16*c* and left side 16*d* would remain in the same plan at all times. The open-box structure of mower deck 16, however, enables one or more of the front end 16*a*, back end 16*b*, right side 16*c*, and left side 16*d* to move into a different plane relative to the rest of the mower deck 16. In other words, mower deck 16 is able to flex, bend, or twist as needed when the mower 10 travels over uneven terrain "G".

The component parts of the open-box structure of the mower deck 16 will now be described in greater detail. Body 42 has a plurality of strengthening members that extend downwardly from the lower surface of top wall 42*a*. These strengthening members comprise walls that extend downwardly from the lower surface of top wall 42*a*. In particular, body 42 includes a front wall 42*b*, a right side wall 42*c*, and a left side wall 42*d* that extend vertically downwardly from the lower surface of top wall 42*a*. Front wall 42*b* extends transversely across the lower surface of top wall 42*a*, is fabricated from a single plate of metal. Front wall 42*b* is located proximate front end 16*a* of mower deck 16. Right side wall 42*c* and left side wall 42*d* extend longitudinally across the lower surface of top wall 42*a*. Front wall 42*b* extends between right side wall 42*c* and left side wall 42*d*. Each of the right side wall 42*c* and left side wall 42*d* comprises a single plate of metal that is substantially straight along its length. It should be noted that body 42 does not include a bottom wall located opposite top wall 42*a* nor does body 42 include a back wall located opposite front wall 42*b*. This is best seen in FIG. 13.

Right side wall 42*c* and left side wall 42*d* are identical in construction and function but are arranged on mower deck 16 as mirror images of each other. Each of right side wall 42*c* and left side wall 42*d* is contoured longitudinally such that a front end region 42*c*' (FIGS. 4A and 5) of right side wall 42*c* and a front end region 42*d*' (FIG. 4C) of left side wall 42*d* angle inwardly toward each other and engage front wall 42*b*. Other than front end regions 42*c*' and 42*d*', the rest of each of the right side wall 42*c* and left side wall 42*d* extend longitudinally along the same plane.

An upper edge of each of the right side wall 42*c* and left side wall 42*d* is contoured such that toward rear end 16*b* of mower deck 16, the upper edges are substantially "Z-shaped". The Z-shaped edge of right side wall 42*c* is identified in FIGS. 2 and 12 by the reference character 42*c*". Edge 42*c*" angles downwardly away from the upper edge of the rest of the right side wall 42*c*. The upper edge of the left side wall 42*d* is similarly configured and includes a Z-shaped edge 42*d*". Upper wall 42*a* extends between the upper edges of right side wall 42*c* and left side wall 42*d* and is contoured in a similar fashion to the upper edges of the right and left side walls 42*c*, 42*d*. The protective shield 26 is secured to a downwardly angled portion 42*a*' (FIG. 6) of the top wall 42*a* that is contoured similarly to the two Z-shaped regions 42*c*", 42*d*".

Top wall 42*a*, front wall 42*b*, right side wall 42*c*, and left side wall 42*d* bound and define an interior chamber 42*e* (FIG. 5). As can be seen from this figure, right front roller 32 (and left front roller 34) are located within a lowermost region of the chamber 42*e*. The lower surface of top wall 42*a* and the inner surfaces of the front wall 42*b*, right side wall 42*c*, and left side wall 42*d* are substantially smooth. A plurality of generally C-shaped walls 42*f* extend downwardly from the lower surface of top wall 42a and into chamber 42e. In the embodiment of the mower 10 that has a width of about 96 inches, there are five C-shaped walls 42f. The openings in the C-shapes face rearwardly toward rear end 16b of mower deck 16.

Referring to FIGS. 12 and 13, the open-box structure of mower deck 16 further includes a plate member 44 that is secured to the upper surface of top wall 42a of body 42 by any suitable means such as by welding. The front end and rear end of plate member 44 are shaped to form strengthening members that extend upwardly from the upper surface of top wall 42a. In particular, a front end of plate member 44 is shaped into a front bar 44a and a rear end of plate member 44 is shaped into a rear bar 44b. Each of the front bar 44a and rear bar 44b extends transversely across top wall 42a of body 42 from proximate the right side 16c to the left side 16d thereof. Each of the front bar 44a and rear bar 44b is effectively fabricated from a single plate of metal. Front bar 44a and rear bar 44b are longitudinally spaced-apart from each other and each extends vertically upwardly from the upper surface of top wall 42a. Front bar 44a and rear bar 44b are oriented substantially parallel to each other and a horizontally-oriented portion 44c of plate 44 extends between bars 44a and 44b.

FIG. 13 shows that neither of front bar 44a and rear bar 44b is of a rectangular cross-section. Instead, each of front bar 44a and rear bar 44b is substantially L-shaped. In other words, the single plate of metal utilized to form front bar 44a and rear bar 44b has been bent once so that an L-shaped member is formed. Front bar 44a includes a first leg 44a' that is substantially vertically-oriented relative to the upper surface of top wall 42a of body 42. Front bar 44a includes a second leg 44a" that extends outwardly and upwardly from an end of first leg 44a' and at an angle of more than 90° relative thereto. Rear bar 44b includes a first leg 44b' that is substantially vertically-oriented relative to the upper surface of top wall 42a of body 42. Rear bar 44b includes a second leg 44b" that extends outwardly and upwardly from an end of first leg 44b' and at slightly less than 90° relative thereto. In other words, second leg 44a" of front bar 44a angles slightly upwardly relative to top wall 42a and second leg 44b" of rear bar 44b angles slightly downwardly relative to top wall 42a.

Plate member 44 provides additional strengthening to top wall 42a of body 42 so that various components of mower 10 are able to be mounted to mower deck 16. Plate member 44 defines a plurality of cut-outs 44d therein that are spaced at lateral (or transverse) intervals from each other. The cut-outs 44d reduce the overall weight of plate member 44 and therefore of mower deck 16. Cut-outs 44d also help to ensure that top wall 42a of body 42 is able to flex, twist and/or bend somewhat as mower 10 moves across slightly uneven terrain "G", as will be described later herein. The open-box type structure of the mower deck 16 is such that it allows for up to about 7 inches of flex between the left and right hand sides of the structure.

Plate 44d and top wall 42a define one or more groups of aligned apertures that extend from the upper surface of mower deck 16 to a lower surface thereof. Together, each group of aligned apertures defines a through-hole 16g that is in communication with interior chamber 42e of body 42e. The purpose of holes 16g will be later described herein.

Still referring to FIGS. 12 and 13, the open-box structure of mower deck 16 further includes a plurality of strengthening members that extend downwardly from the lower surface of top wall 42a. In particular, these strengthening members comprise a plurality of ribs 46, 48, 50, and 52 that each extend longitudinally along the upper surface of top wall 42a of body 42. Each rib 46-52 is fabricated from a single plate of metal and is substantially flat along its length. Ribs 46, 48, 50, and 52 are oriented substantially at right angles to front bar 44a and rear bar 44b and are spaced at lateral intervals from each other across the width "W" of body 42. Ribs 46, 48, 50, and 52 are welded to plate 44, i.e., front bar 44a, rear bar 44b, and plate 44c, and to portions of body 42. Rib 46 is adjacent a first end of each of the front bar 44a and rear bar 44b and rib 48 is adjacent a second end of each of the front bar 44a and rear bar 44b. Ribs 46 and 48 are substantially identical in structure and function. Rib 46 has a front end 46a and a rear end 46b. Similarly, rib 48 has a front end 48a and a rear end 48b. Rear ends 46b, 48b of ribs 46, 48 are located proximate the associated first and second end of rear bar 44b. Front ends 46a, 48a of ribs 46, 48 extend outwardly beyond the front bar 44a for a distance. Front ends 46a, 48a extend along a portion of top wall 42a of body and down part of front wall 42b thereof. As best seen in FIG. 13, rib 46 defines a first aperture 46c at a location forwardly of front bar 44a but before front wall 42b. Rib 46 defines a second aperture 46d proximate rear end 46b. In particular, second aperture 46d is defined rearwardly of first leg 44b' of rear bar 44b and below second leg 44b" thereof. Similarly, as shown in FIG. 12, rib 48 defines a first aperture 48c at a location forwardly of front bar 44a but before front wall 42b. Rib 48 also defines a second aperture 48d proximate rear end 48b. Although not illustrated in this figure, it will be understood that second aperture 48d is located rearwardly of first leg 44b' of rear bar 44b and below second leg 44b" thereof. As is evident from FIG. 13, first aperture 46c (and 48c) is substantially smaller than second aperture 46d (and 48c). The purpose of ribs 46, 48 and apertures 46c, 46d, 48c, 48d will be explained later herein.

Ribs 50 and 52 are located between rib 46 and 4ib 48. Ribs 50 and 52 originate in first leg 44b' of rear bar 44b and extend forwardly through slots (unnumbered) defined in first leg 42a' of front bar 42. Each rib 50, 52 terminates on top wall 42a slightly rearwardly of front wall 42b. As is evident from FIG. 12, the upper edges 50a 52a of ribs 50 and 52 are variously contoured. Various components (not illustrated herein for clarity) are housed in the spaces defined between front bar 44a, rear bar 44b and the various ribs 46, 48, 50, 52. These components include equipment such as pulleys, drive belts, gas cylinders, hoses, cables, etc. The contouring of upper edges 50a, 52a is at least provided in part because some of the non-illustrated components pass over ribs 50, 52 or are anchored thereto. The pulley's drive belts etc. are provided to drive a plurality of mower blades 54 (FIG. 5) that extend downwardly from the lower surface of top wall 42a of body 42 and into chamber 42e. Each mower blade 54 is at least partially surrounded by one of the downwardly extending C-shaped walls 42f which are configured to contain and direct grass cuttings produced by the rotating mower blade 54.

Figure 6:
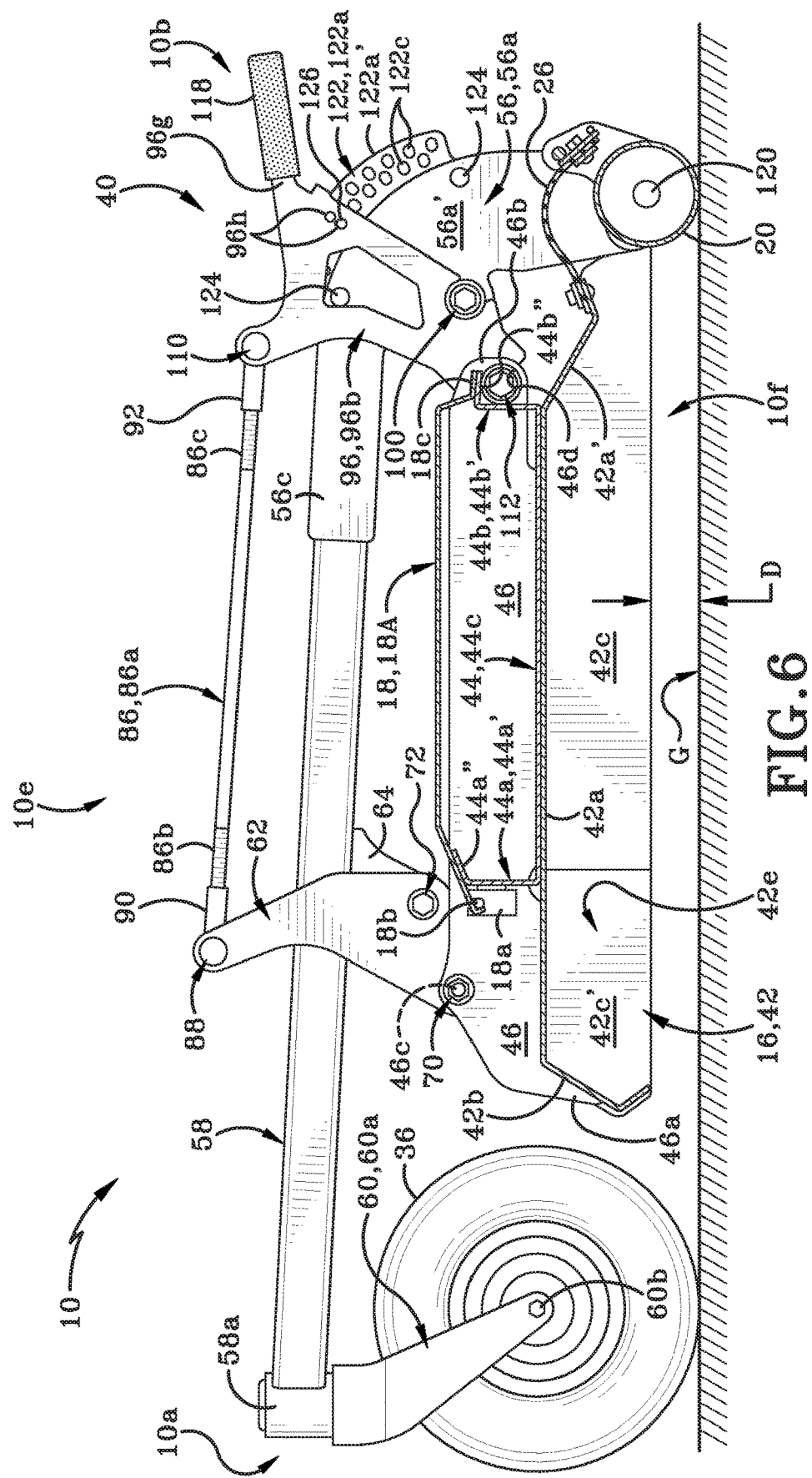
FIG. 6 is a longitudinal cross-section of the mower deck assembly taken along line 6-6 of FIG. 4A.

Referring now to FIGS. 4A to 4C and 6, the one or more covers 18 are engaged with mounting brackets 18a (FIG. 6) which are welded or otherwise secured to a front face of first leg 44a' of front bar 44a. Mower 10 is provided with three covers 18A, 18B, and 18C that are individually selectively moveable between a closed position and an open position. Cover 18A extends inwardly from rib 46 toward rib 50; cover 18C extends inwardly from rib 48 towards rib 52; and cover 18B extends between covers 18A and 18B and spans ribs 50 and 52. Covers 18A and 18C are substantially identical in structure but are secured to mower deck 16 as mirror images of each other. Cover 18B is of a different configuration to covers 18A, 18C because of the various components and differently contoured ribs 50, 52 positioned thereunder. One or more pivot pins 18*b* engage each of the one of more covers 18 (i.e., 18A, 18B, and 18C) to mounting brackets 18*a* provided on first leg 44*a*' of front bar 44. Each cover 18 is individually pivotable about the associated pivot pin(s) 18*b* between a closed position and an open position. When in the closed position, such as is shown in FIG. 6, each cover 18 extends over the space defined between front bar 44*a* and rear bar 44*b* adjacent that particular cover 18. The cover 18 closes off access to the space and protects any components mounted within the space. When each cover 18 is pivoted to the open position, the various components housed within the associated portion of the space are accessible. It can be seen in FIG. 6 that when cover 18 is in the closed position, a lip 18*c* thereof rests upon second leg 44*b*" of rear bar 44*b*. Each cover 18 has a similar lip 18*c*.

As discussed above, cover 18C is different in configuration to covers 18A and 18C. Part of the reason for this is that some of the components secured to ribs 50, 52 and located within the space defined between front bar 44*a* and rear bar 44*b* are taller or need more room to function relative to the components housed under covers 18A and 18C. Additionally, parts of some components, such as the hydraulic cylinder 55 (FIG. 4B) extend outwardly through openings 18*d* defined in the rearward portion of the cover 18C. It can be seen in this figure that hydraulic cylinder 55 is secured to hitch assembly 14 by a mounting bracket 55*a*.

Referring to FIGS. 2 to 11, the various components that comprise adjustment mechanism 40 will now be described in greater detail. Adjustment mechanism 40 is comprised of a first assembly 40A (FIGS. 3A and 4A) positioned proximate a right side 16*c* of mower deck 16, and a second assembly 40B (FIGS. 3B and 4C) positioned proximate a left side 16*d* of mower deck 16. Each of the first assembly 40A and second assembly 40B is a four-bar linkage that is operable to adjust the cutting height of the mower 10. The first and second assemblies 40A, 40B do not utilize chains to raise or lower mower deck 16 but, instead, use generally rigid bars to accomplish the raising or lowering of mower deck 16. In particular, each four-bar linkage is utilized to raise or lower one entire side of the mower deck 16 relative to the terrain "G". In other words, the four-bar linkage that raises the right side of the mower deck 16 simultaneously raises a right front corner and a right rear corner thereof. The four-bar linkage that raises the left side of the mower deck simultaneously raises a left front corner and a left rear corner of mower deck 16. This is unlike previously known systems where only one or the other of a front corner or a rear corner of a mower deck is raised or lowered. In summary, first assembly 40A is independently actuated to simultaneously raise or lower both of a right front corner and a right rear corner of the mower deck 16; and second assembly 40B is independently actuated to simultaneously raise or lower both of a left front corner and a left rear corner of the mower deck 16.

The first assembly 40A and the second assembly 40B are each adjustable without requiring the use of tools. The tool-free adjustability is unlike prior art mower decks in the same class range. For safe operation of mower 10, both of the first assembly 40A and second assembly 40B should be set to the same height position. Setting the height position of the first and second assemblies 40A, 40*b* will be discussed later herein.

The first and second assemblies are substantially identical to each other but are mounted on mower deck 16 as mirror images of each other. The same numbers in the following description correspond to identical components in the first assembly 40A and in the second assembly 40B. Any differences between the two assemblies will be pointed out. Only the first assembly 40A of adjustment mechanism 40 will be focused upon herein in detail but it should be understood that the description applies equally to the second assembly 40B.

Referring still to FIGS. 2 to 11, the first assembly 40A includes a back plate 56 and a carrier frame 58 which extends forwardly from the back plate 56. Similarly, second assembly 40B includes a back plate 56 and a carrier frame 58 which extends forwardly therefrom. The two back plates 56 and the two carrier frames 58 are laterally spaced apart from each other on mower deck 16.

Figure 2:
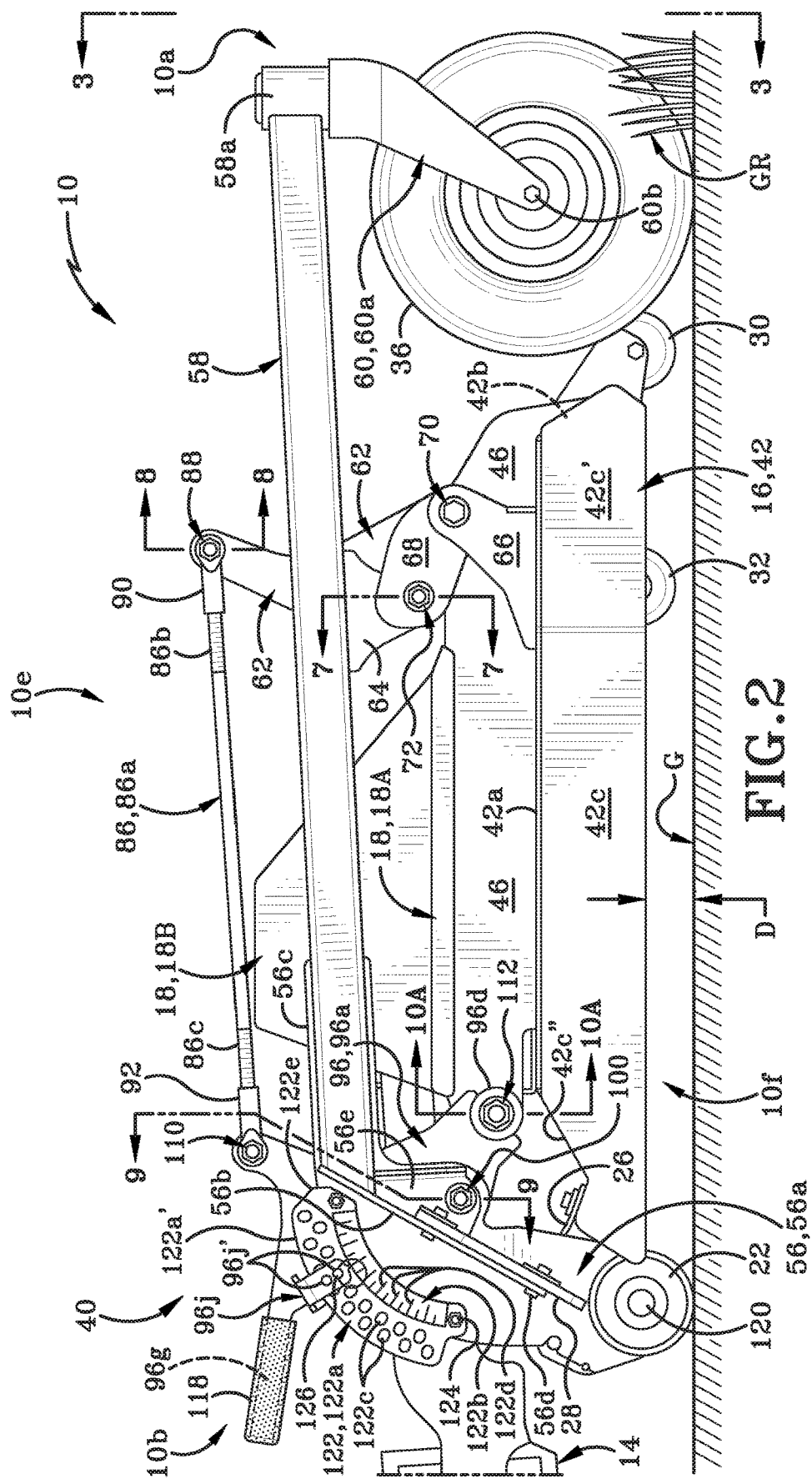
FIG. 2 is a right side elevation view of the mower deck assembly of FIG. 1 shown on its own.
Figure 3:
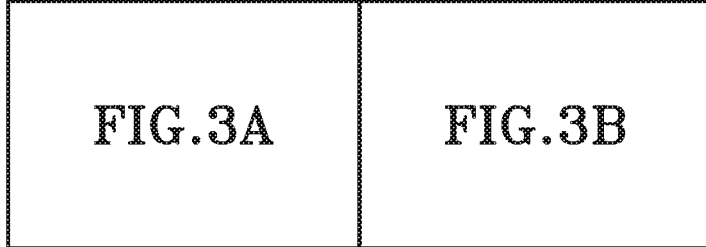
FIG. 3 is a block diagram showing the relationship between FIG. 3A and FIG. 3B.
Figure 4:
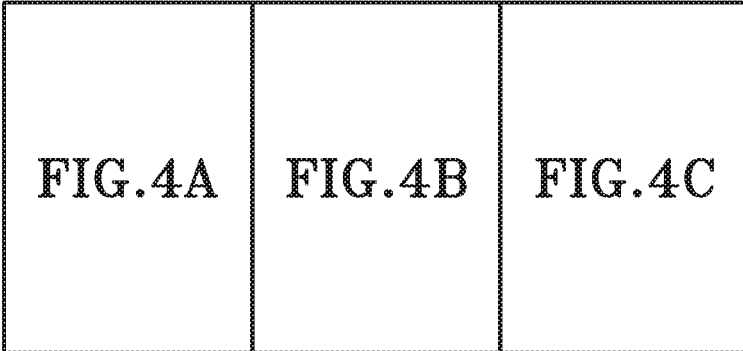
FIG. 4 is a block diagram showing the relationship between FIG. 4A, FIG. 4B, and, FIG. 4C.
Figure 4A:
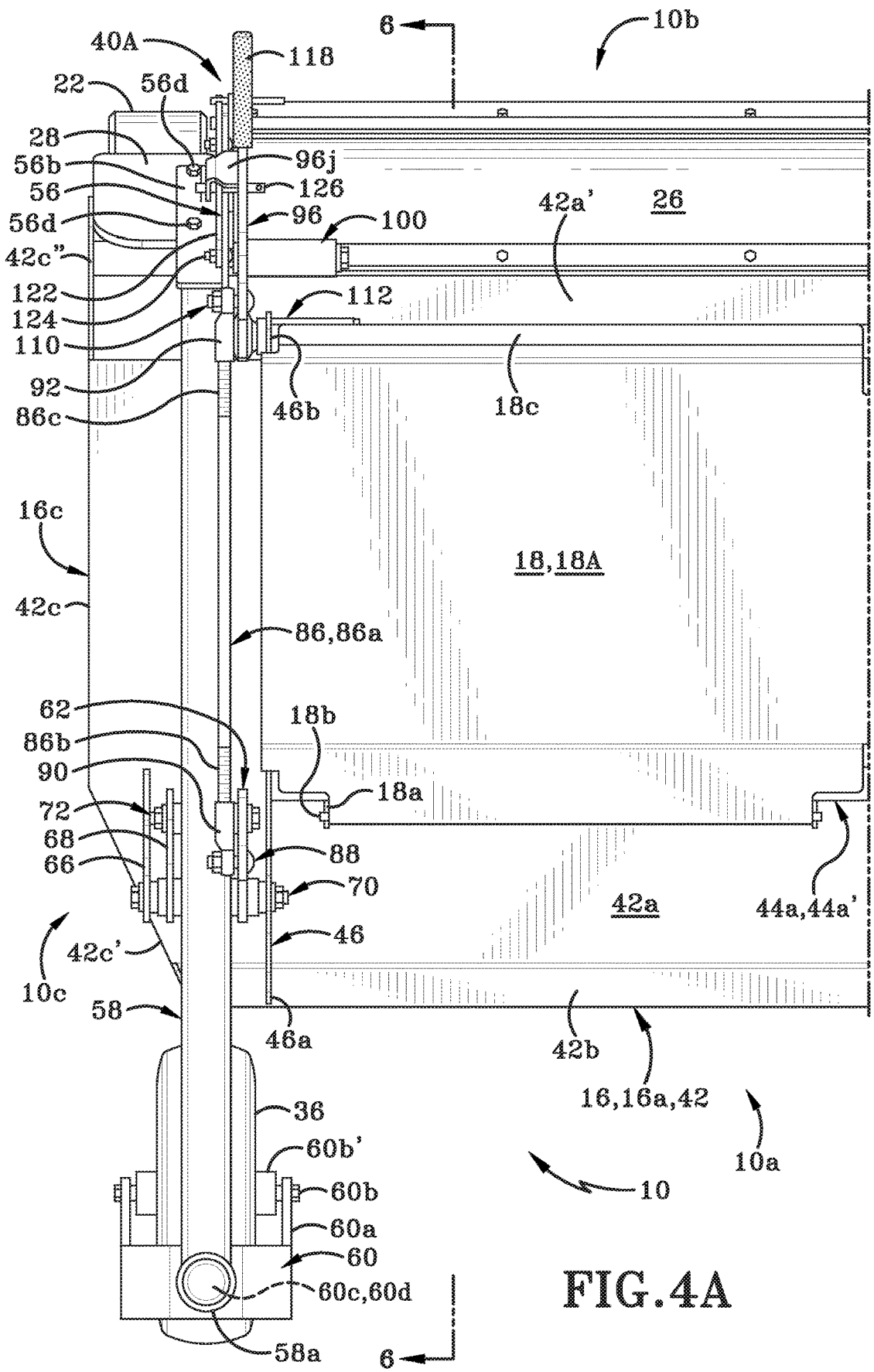
FIG. 4A is a top plan view of the right side third of the mower deck assembly of FIG. 1.
Figure 4B:
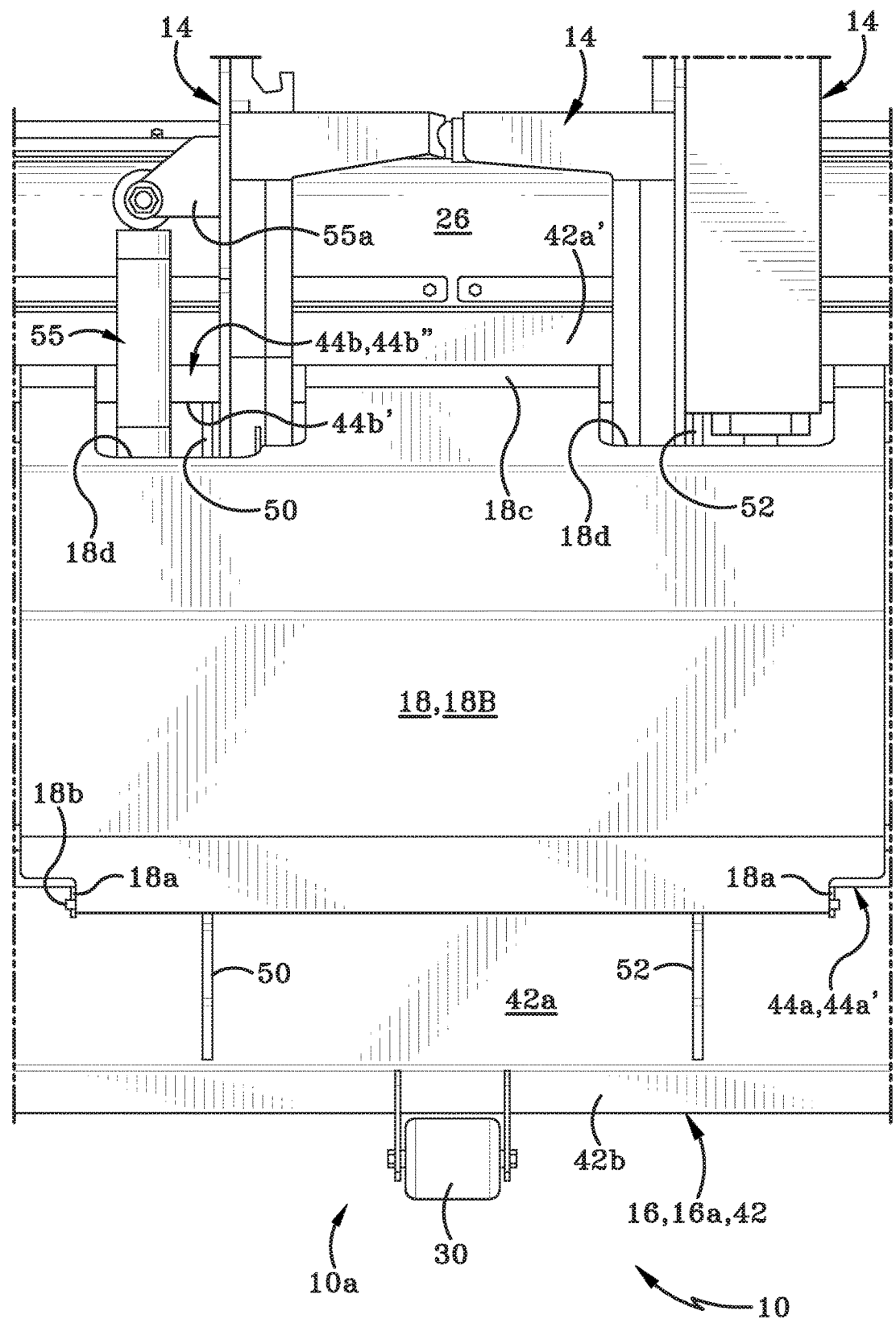
FIG. 4B is a top plan view of the middle third of the mower deck assembly of FIG. 1.
Figure 4C:
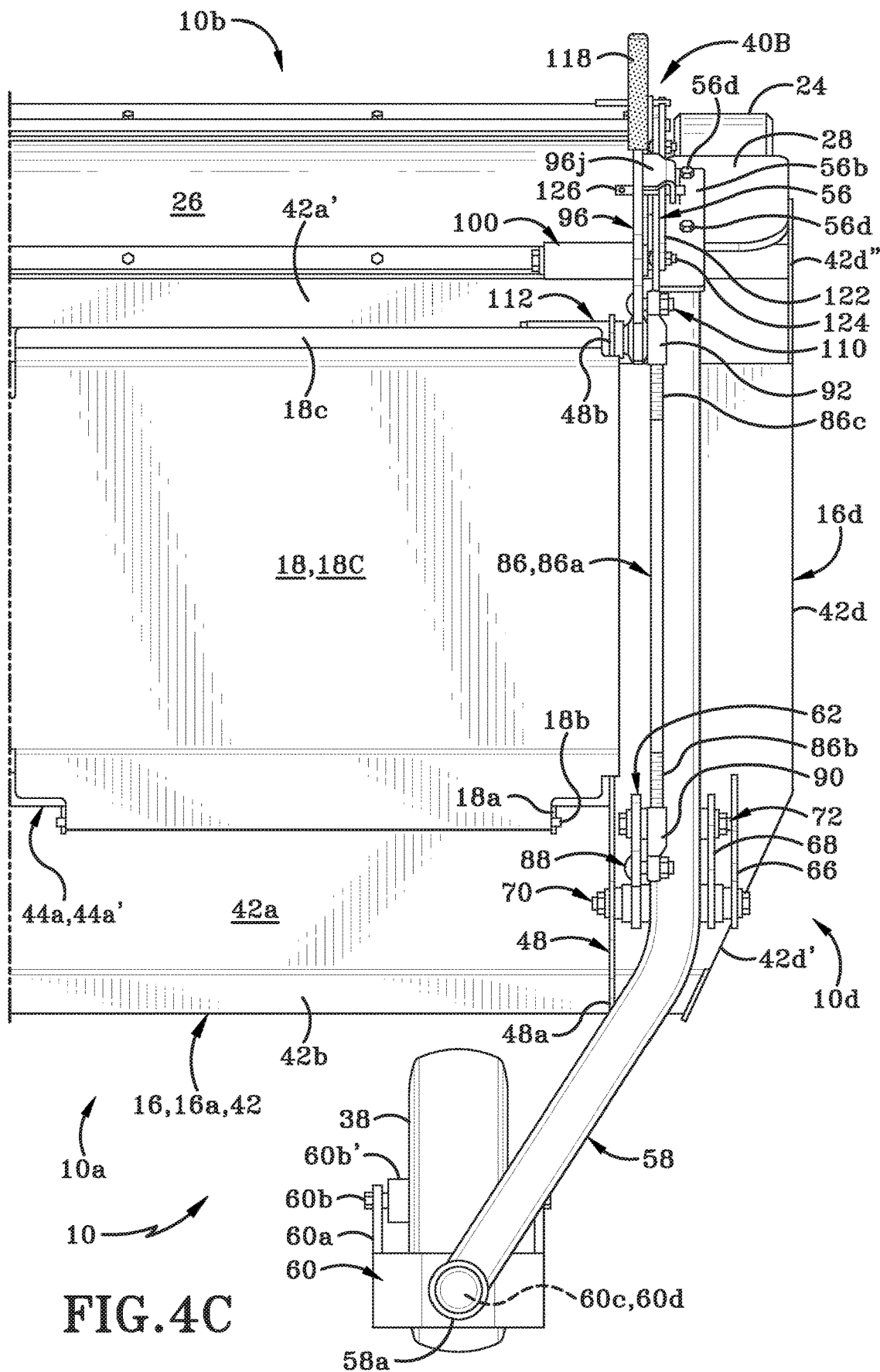
FIG. 4C is a top plan view of the left side third of the mower deck assembly of FIG. 1.

Back plate 56 as illustrated includes at least a first section 56*a*, a second section 56*b*, and a third section 56*c* (FIG. 6) that are welded or otherwise secured together. First section 56*a* is oriented generally parallel to right side wall 42*c* of body 42. Second section 56*b* extends laterally outwardly from an outer surface of first section 56*a* and is oriented generally at right angles relative thereto. Second section 56*b* is furthermore tilted at an angle relative to first section 56*a* in such a way that a bottom end thereof is located a distance further rearwardly from wheel 36 than is a top end thereof. Flap 28 is secured to second section 56*b* of back plate 56 by fasteners 56*d* (FIGS. 4A and 9). The fasteners 56*d* may include a bolt, a nut, and appropriate washers. Third section 56*c* of back plate 56 extends for a distance forwardly from first section 56*a* and for a distance along an inner side of carrier frame 58. As shown in FIGS. 2 and 9, a brace plate 56*e* extends downwardly from a lower surface of carrier frame 58 adjacent an outer surface of first section 56*a*. Brace plate 56*e* is welded to carrier frame 58 and to the outer surface of first section 56*a*. Aligned holes 56*f*, 56*g* (FIG. 9) are defined in brace plate 56*e* and first section 56*a*, respectively. The purpose of back plate 56 will be described later herein.

The carrier frame 58 extends forwardly from back plate 56 and connects to a mounting assembly 60 for wheel 36. It should be noted by comparing FIGS. 4A and 4C, that the carrier frame 58 of first assembly 40A provided proximate the right side 16*c* of mower deck 16 is substantially straight along its entire length while the carrier frame 58 of second assembly 40B provided proximate the left side 16*d* of mower deck 16 includes an inwardly angled front region. The angled front region originates generally proximate a front end 16*a* of mower deck 16 and angles forwardly and inwardly therefrom. It will be understood in other embodiments, the straight carrier frame could be provided proximate the left side 16*d* of the mower deck 16 while the angled carrier frame could be provided proximate the right side 16*c* thereof. In other embodiments, both carrier frames 58 may be straight. In yet other embodiments, both carrier frames may be angled.

As indicated above, carrier frame 58 engages a mounting assembly 60 at a forward end thereof. Mounting assembly 60 includes a yolk 60*a* that is generally U-shaped, having a first leg that is located adjacent a first side of wheel 36, a second leg that is adjacent a second side of wheel 36, and a middle leg that extends between upper ends of the first leg and second leg. An axle 60*b* and sleeve 60*b*' extends through aligned holes in the first and second legs of yolk 60*a* and through a central hole defined by wheel 36. Yolk 60*a* includes a king pin and bearing 60*c* (FIGS. 3B 4A) which extends upwardly from the middle leg of yolk 60*a*. The king pin and bearing 60*c* are received within a collar 58*a* provided at the forward end of carrier frame 58. The bearing, which surrounds the king pin, allows yolk 60*a* and thereby wheel 36 to pivot relative to carrier frame 58. A bearing cap 60*d* closes off access to the bearing and king pin 60*c*.

Figure 7:
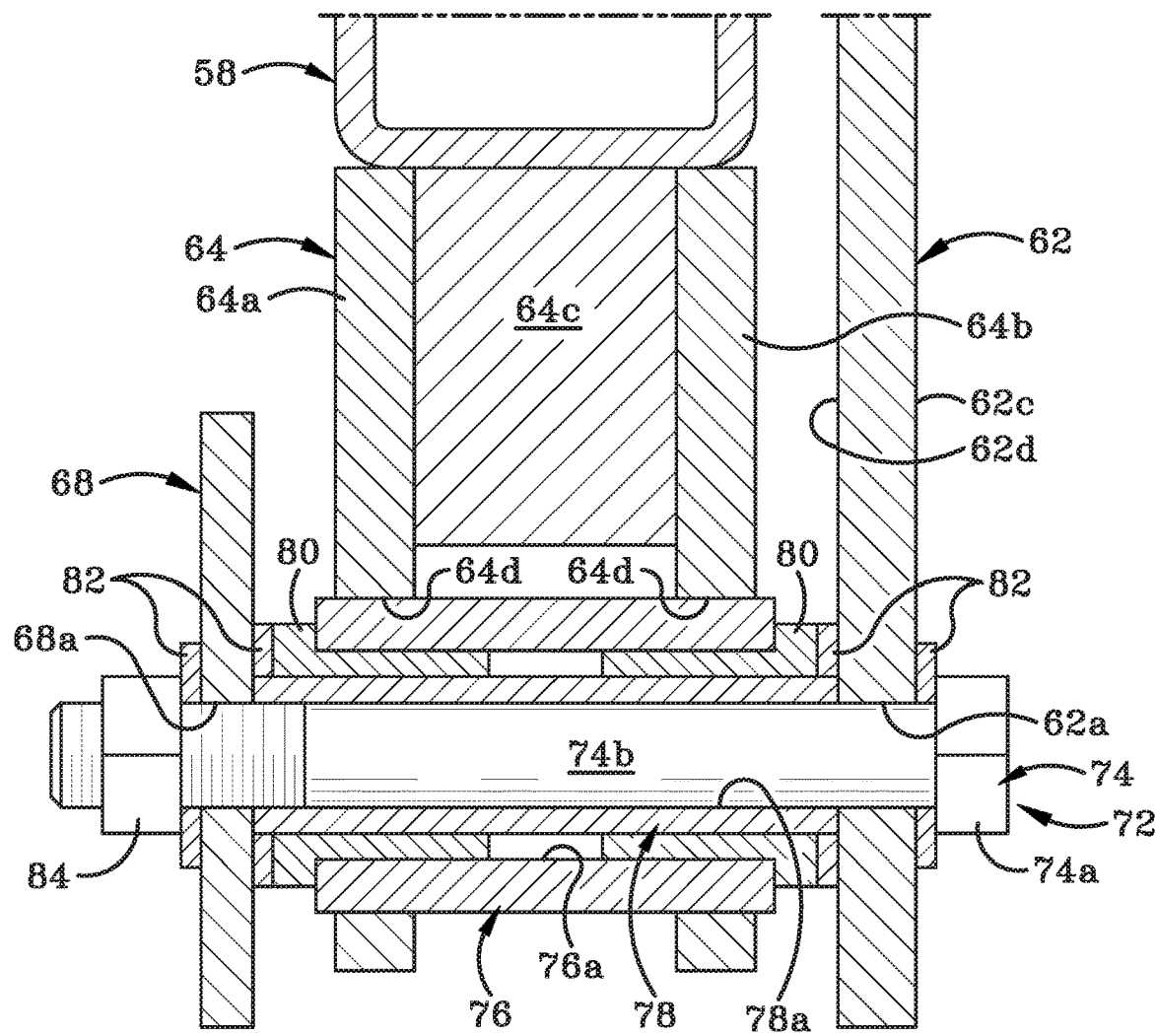
FIG. 7 is a cross-section of the pivot assembly for the front plate taken along line 7-7 of FIG. 2.
Figure 8:
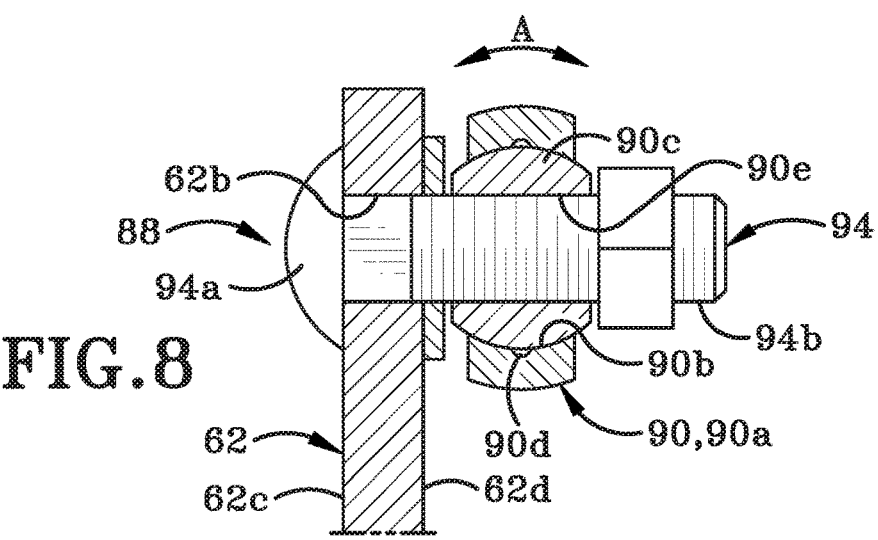
FIG. 8 is a cross-section of the connector mechanism for the adjustment rod taken along line 8-8 of FIG. 2.

First assembly 40A further includes a front plate 62 (FIG. 6) that is operatively engaged with carrier frame 58 via a mounting flange 64. Mounting flange 64 is welded to lower surface of carrier frame 58 and extends downwardly therefrom as is shown in FIG. 7. A mounting plate 66 is welded to and extends upwardly from top wall 42*a* of 42 and proximate a front end 42*b* thereof. Mounting plate 66 is therefore a fixed support that extends upwardly from body 42. A rotation plate 68 is positioned between mounting flange 64 and mounting plate 66. As best seen in FIGS. 3B and 4A, a fastener assembly 70 secures mounting plate 66, rotation plate 68, front plate 62, and rib 46 together. Fastener assembly 70 comprises a sleeve, a bolt that passes through sleeve, a nut, bushings, and associated washers. The sleeve is welded at one end to rotation plate 68 and at the other end to front plate 62. The fastener assembly 70 therefore ensures that rotation plate 68 and front plate 62 move in unison, as will be described later herein. The bolt of fastener assembly 70 passes through aligned apertures defined in mounting plate 66, through the sleeve and thereby through rotation plate 68 and front plate 62, and then through the aligned first aperture 46*c* (FIG. 13) defined in rib 46. As indicated earlier herein, both the rib 46 and mounting plate 66 are fixedly secured to top wall 42*a* of body 42 by welding or any other suitable means and extend vertically upwardly therefrom. Front plate 62 and rotation plate 68 are therefore able to pivot about the shaft of the bolt of fastener assembly 70 and relative to rib 46 and mounting plate 66. The front plate 62, rotation plate 68, and sleeve of fastener assembly 70 form a U-shaped lifting assembly. Consequently, when front plate 62 is moved in a first direction, this U-shaped lifting assembly will pull mower deck 16 upwardly. When front plate 62 is moved in a second direction, this U-shaped lifting assembly will push mower deck 16 downwardly. This will be described further herein.

A first connector assembly 72 secures front plate 62, flange 64, and rotation plate 68 together. First connector assembly 72 and its engagement with front plate 62, flange 64, and rotation plate 68 are shown in detail in FIG. 7. First connector assembly 72 comprises a bolt 74 having a head 74*a* and a threaded shaft 74*b*. The shaft 74*a* passes through an aperture 62*a* defined in front plate 62. (While not shown in FIG. 7, is should be understood that aperture 62*a* is spaced longitudinally a distance away from the aperture through which the bolt of fastener assembly 70 passes.) Flange 64 comprises a pair of side plates 64*a*, 64*b* and a core 64*c* that extends between side plates 64*a*, 64*b*. An aperture 64*d* is defined through each side plate 64*a*, 64*b*. First connector assembly 72 further comprises a first sleeve 76 and a second sleeve 78 that are received through the bore 76*a* of first sleeve 76. A pair of bushings 80 are positioned between the first and second sleeves 76, 78. Sleeve 76 is seated in the aperture 64*d* defined in flange 64 and is welded to flange 64 and, consequently, second sleeve 78 is able to rotate relative to first sleeve 76. The shaft 74*b* of bolt 74 extends through aperture 62*a* of front plate 62, through bore 78*a* of second sleeve 78, and through an aperture 68*a* defined in rotation plate 68. Various washers 82 are positioned between the components. A nut 84 locks bolt 74 in place. Shaft 74*b* of bolt 74 is tightly retained within first sleeve 76. Front plate 62 and rotation plate 68 are able to pivot about bolt 74 and relative to flange 64 and carrier frame 58. This will be described later herein.

As best seen in FIG. 6, fastener assembly 70 engages front plate 62 toward a first end region thereof. First connector assembly 72 engages front plate 62 a distance away from fastener assembly 70 in a direction moving toward an opposed second end region of front plate 62. First connector assembly 72 is offset on front plate 62 relative to fastener assembly 70.

The first assembly 40A of adjustment mechanism 40 further includes an adjustment rod 86. The second end region of front plate 62 is operatively engaged with adjustment rod 86 by way of a second connector assembly 88 (described hereafter). Second connector assembly 88 is a ball-joint that is located a distance outwardly beyond first connector assembly 72 on front plate 62 and is located vertically generally intermediate fastener assembly 70 and first connector assembly. In particular, the ball-joint which comprises second connector assembly 88 is a DANUSER® ball-joint. (DANUSER® is a registered trademark of Danuser Machine Company, Inc. of Fulton, Mo., USA.) It will be understood that ball-joints produced by other manufacturers may be utilized in other embodiments.

FIG. 2 shows that adjustment rod 86 includes an elongate cylindrical shaft 86*a* which is threaded at a first end 86*b* and at a second end 86*c*. A first coupler 90 is threadedly engaged with the first end 86*b* of shaft 86*a* and a second coupler 92 is threadedly engaged with the second end 86*c* of the shaft 86*a*. Second connector assembly 88 is shown in greater detail in FIG. 8. First coupler 90 includes a body 90*a* that defines an aperture 90*b* therein and in which a ball member 90*c* is engaged. The radius of curvature of aperture 90*b* is greater than the radius of curvature of ball member 90*c*. Ball member 90*c* is therefore able to rotate slightly relative to the portion of the body 90*a* that defines aperture 90*b*. The slight rotational motion of ball member 90*b* relative to body 90*a* is indicated by the arrows "A" in FIG. 8. An oil port 90*d* is provided in body 90*a* to ensure that the exterior surface of ball member 90*b* is lubricated and can therefore move easily relative to body 90*a*. Body 90*a* defines a bore 90*e* through which a fastener 94 is engaged. Fastener 94 includes a head 94*a* and threaded shaft 94*b*. Shaft 94*b* is inserted through aperture 62*b* defined in front plate 62. Aperture 62*b* extends from the inner surface 62*c* of front plate 62 through to the outer surface 62*d* thereof. Shaft 94*b* is subsequently inserted through a hole defined in a washer 94*c* and then through bore 90*e*. A nut 94*d* is threadedly engaged with shaft 94*b* to secure first coupler 90 and front plate 62 together. When adjustment mechanism 40 is actuated, the second connector 88 permits slight rotational motion between the first end 86*b* of adjustment rod 86 and front plate 62.

Referring still to FIGS. 2 and 9, the first assembly 40A of adjustment mechanism 40 further comprises a rocker plate 96. FIG. 9 shows rocker plate 96 is oriented generally parallel to first section 56*a* of back plate 56 and is located inwardly of an inner surface 56*a*' of back plate 56. Inner surface 56*a*' of first section 56*a* of back plate 56 separated from an outer surface 96*a* of rocker plate 96 by a gap 98. Inner surface 96*b* of rocker plate 96 is spaced laterally a distance away from the rocker plate 96 of the second assembly 40B of adjustment mechanism 40. Rocker plate 96 defines a through-hole 96*c* that extends from outer surface 96*a* of rocker plate 96 through to inner surface 96*b* thereof. Back plate 56 and rocker plate 96 are pivotally engaged with each other by a third connector mower 100.

Third connector mower 100 comprises a bolt 102 having a head 102*a* and a threaded shaft 102*b*. Third connector mower 100 further comprises a first sleeve 104 and a second sleeve 106. Second sleeve 106 is received through bore 104*a* of first sleeve 104. A pair of bushings 108 is positioned between the first and second sleeves 104, 106. The shaft 102b of bolt 102 extends through bore 106a of second sleeve 106, through hole 56g defined in first section 56a of back plate 56 and then through hole 56f defined in brace plate 56e. Various washers 102d are positioned between the components. A nut 102c locks bolt 102 in place. An exterior surface 104b of first sleeve 104 is welded to the portions of rocker plate 96 that define through-hole 96c. First sleeve 104 is therefore fixedly engaged with rocker plate 96 and moves in unison therewith. Second sleeve 106 is fixedly engaged with back plate 56. First sleeve 104 and second sleeve 106 are able to rotate relative to each other. Consequently, third connector mower 100 allows back plate 56 and rocker plate 96 to pivot relative to each other.

Referring to FIG. 6, it can be seen that diagonally opposite third connector mower 100 on rocker plate 96 is a fourth connector assembly 110. Fourth connector assembly 110 secures rocker plate 96 to second coupler 92 at second end 86c of adjustment rod 86. Fourth connector assembly 110 is substantially identical in structure and function to second connector assembly 88 shown in FIG. 8 and therefore will not be described in any further detail.

Figure 10B:
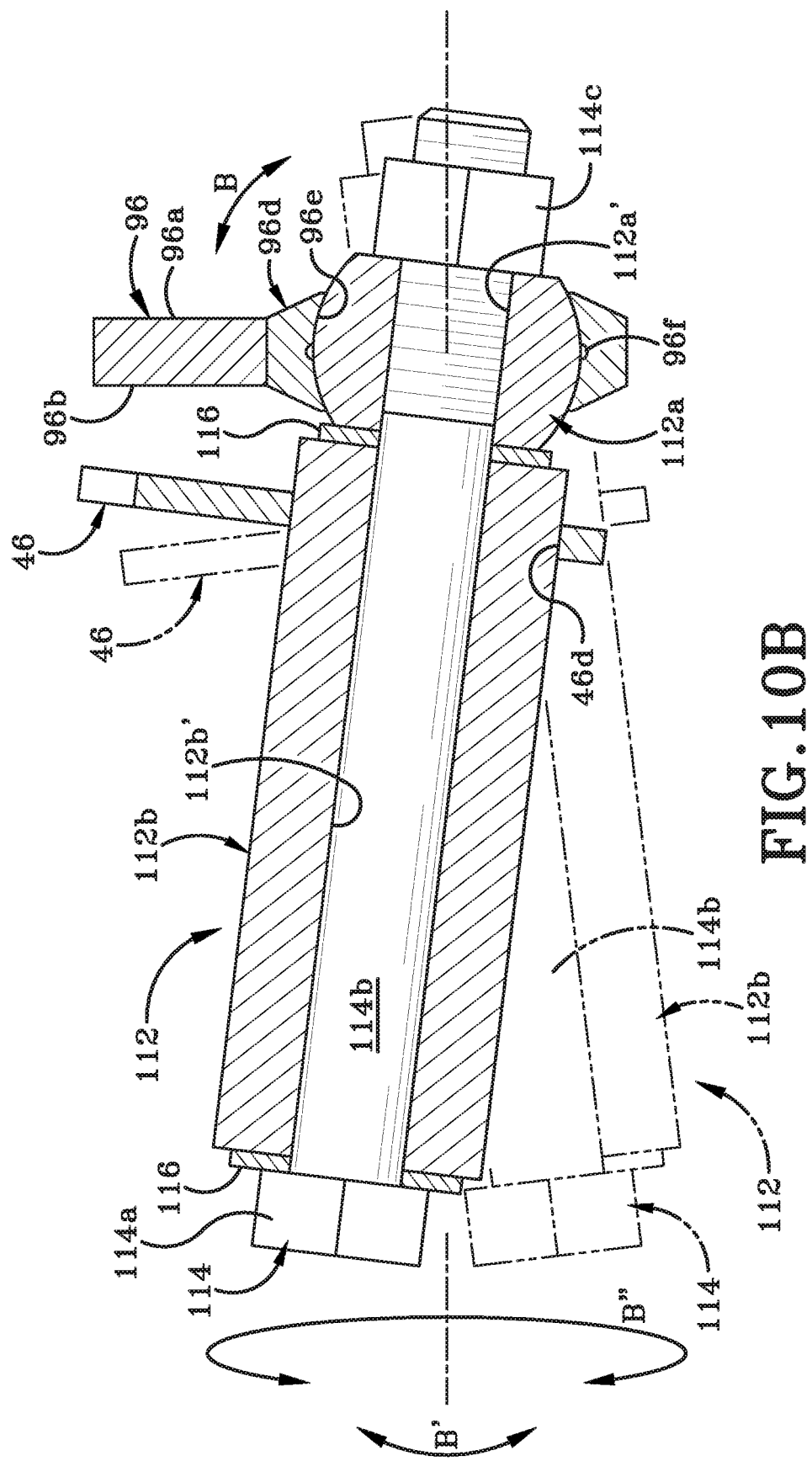
FIG. 10B is a cross-section of the connector mechanism similar to FIG. 10A but showing the motion of the connector mechanism as the mower deck assembly flexes and tilts.

Referring to FIGS. 2 and 5, a fifth connector assembly 112 secures rocker plate 96 to rib 46. Fifth connector assembly 112 is shown in detail in FIGS. 10A and 10B. Fifth connector assembly 112 again includes a DANUSER® ball-joint. Fifth connector assembly 112 engages a lowermost forward region 96d of rocker plate 96. As shown in FIGS. 10A and 10B, region 96d of rocker plate 96 is thicker than the rest of rocker plate 96 located upwardly and rearwardly therefrom and flares outwardly relative to the rest of rocker plate 96. This thicker flared region 96d defines an aperture 96e therein that extends from outer surface 96a through to inner surface 96b of rocker plate 96. The portion of flared region 96d that defines aperture 96e is concavely curved and a ball member 112a of fifth connector assembly 112 is received and retained therein. Flared region 96d of rocker plate 96 defines an oil port 96f therein to ensure that lubrication can be applied to the exterior surface of ball member 112a. The radius of curvature of aperture 96e is greater than the radius of curvature of ball member 112a and consequently some rotational motion of ball member 112a relative to rocker plate 96 is permitted (as indicated by arrows B, B' and B" in FIG. 10B).

Fifth connector assembly 112 further includes a collar 112b that passes through the aperture 46d defined in rib 46. Collar 112b is welded to rib 46 and therefore will move in unison with body 42 of mower deck 16. Fifth connector assembly 112 further includes a bolt 114 that includes a head 114a and a shaft 114b that is threaded at an end remote from head 114a. Shaft 114b is threaded through a hole of a first washer 116, through bore 112b' of collar 112b, through a hole of a second washer 116, and through bore 112a' of ball member 112a. The nut 114c is threadedly engaged with shaft 114b to lock fifth connector assembly 112 to rocker plate 96. When mower deck 16 tilts and flexes as the mower 10 moves across the terrain, the rib 46 will move with mower deck 16 but that motion will not be transferred to rocker plate 96 to the same degree as would be the case if there were a rigid connection between rocker plate 96 and rib 46 because of the rotational motion of ball member 112b relative to rocker plate 96.

Referring again to FIG. 6, it can be seen that a handle 118 is engaged around a rearwardly-extending projection 96g formed on rocker plate 96 diagonally opposite fifth connector assembly 112. Handle 118 may be fabricated from any resilient material that makes it comfortable for the operator to grasp and manipulate the same. Handle 118 is designed to be grasped and used as a lever to manipulate rocker plate 96 and thereby the rest of the four-bar linkage that comprises the associated one of the first assembly 40A and second assembly 40B. Handle 118 is effectively a lever that is operatively engaged with the four-bar linkage (first assembly 40A or second assembly 40B), and the raising or lowering of the mower deck 60 is initiated by manipulating the lever 118.

Although not illustrated in the attached figures, a bottom region of each back plate 56 defines an aperture therein through which an axle 120 (FIGS. 2 and 5) is received. Striping roller 20, right side roller 22, and left side roller 24 are operatively engaged with axle 120 and are rotatable thereabout.

Cutting height adjustment mechanism 40 further includes an adjustment plate 122 that is secured to an upper region of back plate 56 by fasteners 124. An inner surface of adjustment plate 122 is placed in abutting contact with an outer surface of first region 56a of back plate 56. Adjustment plate 122 is selectively removable from back plate 56 so that the plate 122 may be replaced should it ever becomes damaged. Adjustment plate 122 includes an adjustment region 122a and a scale 1224b. At least the adjustment region 122a of adjustment plate 122 extends for a distance beyond an upper edge of first region 56a of back plate 56. Adjustment region 122a defines a plurality of apertures 122c therein that extend between the inner surface of the adjustment region 122a and the outer surface thereof. The apertures 122c, as illustrated in the figures, are arranged in two arcuate rows along the adjustment plate 122. An uppermost edge 122a' (FIG. 6) of adjustment region 122a is arcuate in shape. The two rows of apertures 122c are arranged in arcs that mirror the shape of uppermost edge 122a'. It should be noted that the apertures 122c in the outermost row, i.e., closest to edge 122a', are radially offset from the apertures 122c in the lowermost row. In particular, substantially each of the apertures 122c located in the lowermost row is positioned between two adjacent apertures 122c in the outermost row.

Scale 122b on adjustment plate 122 is positioned beneath the adjustment region 122a. A plurality of graduated markings 122d are provided at regular intervals along scale 122b. Each of the graduated markings 122d is associated with a corresponding one of the apertures 122c defined in adjustment region 122b, as will be described hereafter. Scale 122b provides an indication of the cut range of mower 10. As indicated earlier herein, the cut range is from about 1 inch up to about 5 inches. In one embodiment, each marking 122d on scale 122b corresponds to a ¼ inch increment in cut height.

Referring to FIG. 6, rocker plate 96 defines two apertures 96h therein. Each aperture 96h extends between outer surface 96a of rocker plate 96 and inner surface 96b thereof. Apertures 96h are oriented one above the other on rocker plate 96 and are spaced a distance from each other that corresponds to a distance between the outermost row and lowermost row of apertures 122c defined in adjustment region 122a. One or the other of the apertures 96h may selectively be brought into alignment with one of the apertures 122c on adjustment region 122b. The particular aperture 122c selected for use on adjustment region 122 sets the height of mower deck 16, as will be described later herein.

FIGS. 2 and 4A show that rocker plate 96 includes an L-shaped setter plate 96j. A first leg of the setter plate 96j is welded to outer surface 96a of rocker plate 96. In particular, the first leg of setter plate 96j is positioned on rocker plate 96 such that a lower surface of the first leg will extend over the uppermost edge 122a' of adjustment plate 122. A second leg of the setter plate 96j extends outwardly and downwardly from the first leg thereof in such a way that the second leg will extend downwardly in front of an outer surface of the adjustment region 122a of adjustment plate 122a. The second leg defines two apertures 96j' therein that correspond substantially in shape and position to apertures 96h defined in rocker plate 96. The apertures 96j' in the second leg of setter plate 96j are aligned with the apertures 96h defined in rocker plate 96. A locking pin 126 is inserted through one of the apertures 96j' in the second leg of setter plate 96j, through one of the apertures 122c defined in adjustment region 122a and then through the aligned aperture 96h in rocker plate 96. Engaging this locking pin 126 in this manner secures rocker plate 96 at a particular orientation relative to back plate 56. Locking pin 126 (FIG. 4A) may be attached by a cord (not shown) to rocker plate 96 or adjustment plate 122 so that the pin 126 is always readily available for the operator.

FIGS. 1 and 2 show mower 10 ready for use to move over the terrain "G" to mow grass "GR". Mower 10 is engaged via hitch assembly 14 to a tractor 12 or any other suitable utility vehicle. As mentioned earlier herein, mower 10 is illustrated as being positioned forwardly of tractor 12 such that forward motion across the terrain "G" is indicated by the arrow "C". Terrain "G" as illustrated is substantially level, i.e., free of any bumps and indentations, and the bottom of mower deck 16 is set at a height "D" above the terrain "G" in order for the mower blades 54 (FIG. 5) cut grass "GR" at a desired length.

In order to set mower deck 16 at a particular desired height "D", locking pin 126 is inserted through one of the apertures 96j' in the second leg of setter plate 96j, through one of the apertures 122c defined in adjustment region 122a and then through the aligned aperture 96h in rocker plate 96. In particular, locking pin 126 is engaged in a hole in the lower row of holes defined in adjustment plate 122. Specifically, the locking pin 126 is engaged in the third hole rearward from a leading edge 122e of adjustment plate 122. Engaging this locking pin 126 in this manner secures rocker plate 96 at a particular orientation relative to back plate 56.

If the operator wishes to raise or lower the mower deck 16, the operator will set both of the first assembly 40A and the second assembly 40B of the adjustment mechanism 40 at the same position. Selecting one of the first assembly 40A and the second assembly 40B, the operator will first push the handle 118 slightly downwardly in order to slightly release pressure on locking pin 126. The operator will then remove locking pin 126 from the aligned apertures and holes in setter plate 96j, adjustment plate 122, and rocker plate 96. Removal of locking pin 126 leaves rocker plate 96 free to pivot in response to manipulation of handle 118. The operator may then raise or lower the handle 118 to the desired cutting height setting on scale 122 and replace the locking pin 126. The same steps will then be repeated for the other of the first assembly 40A and second assembly 40B. When, for example, the operator wishes to raise the mower deck 16 from the height "D" shown in FIG. 2 to the height "D1" shown in FIG. 11, after removing locking pin 126 the operator will push handle 118 downwardly in the direction of arrow "E". This motion causes rocker plate 96 to pivot counterclockwise about fifth connector assembly 112. Setter plate 96 therefore travels over the uppermost edge 122a' of adjustment plate 122 in a counterclockwise direction "E". The operator will push downwardly on handle 118 until the apertures 96j' and 96h on setter plate 96j and rocker plate 96, respectively, come into alignment with a particular hole 122c that corresponds to a selected marking 122d on scale 122b. When the operator pushes the setter plate 96j downwardly too far in the direction "E" such that the desired selected hole 122c is passed, he or she will simply move handle 118 in a direction opposite to arrow "E" and until the desired selected hole 122d is aligned with apertures 96j' and 96h. The locking pin 126 will then be reengaged in the aligned apertures 96j', 96h and hole 122d. As is evident from FIG. 11, the selected hole 122d in which locking pin 126 is engaged is the hole 122d in the uppermost row on adjustment plate 122 that is the greatest distance from leading edge 122e.

Figure 11:
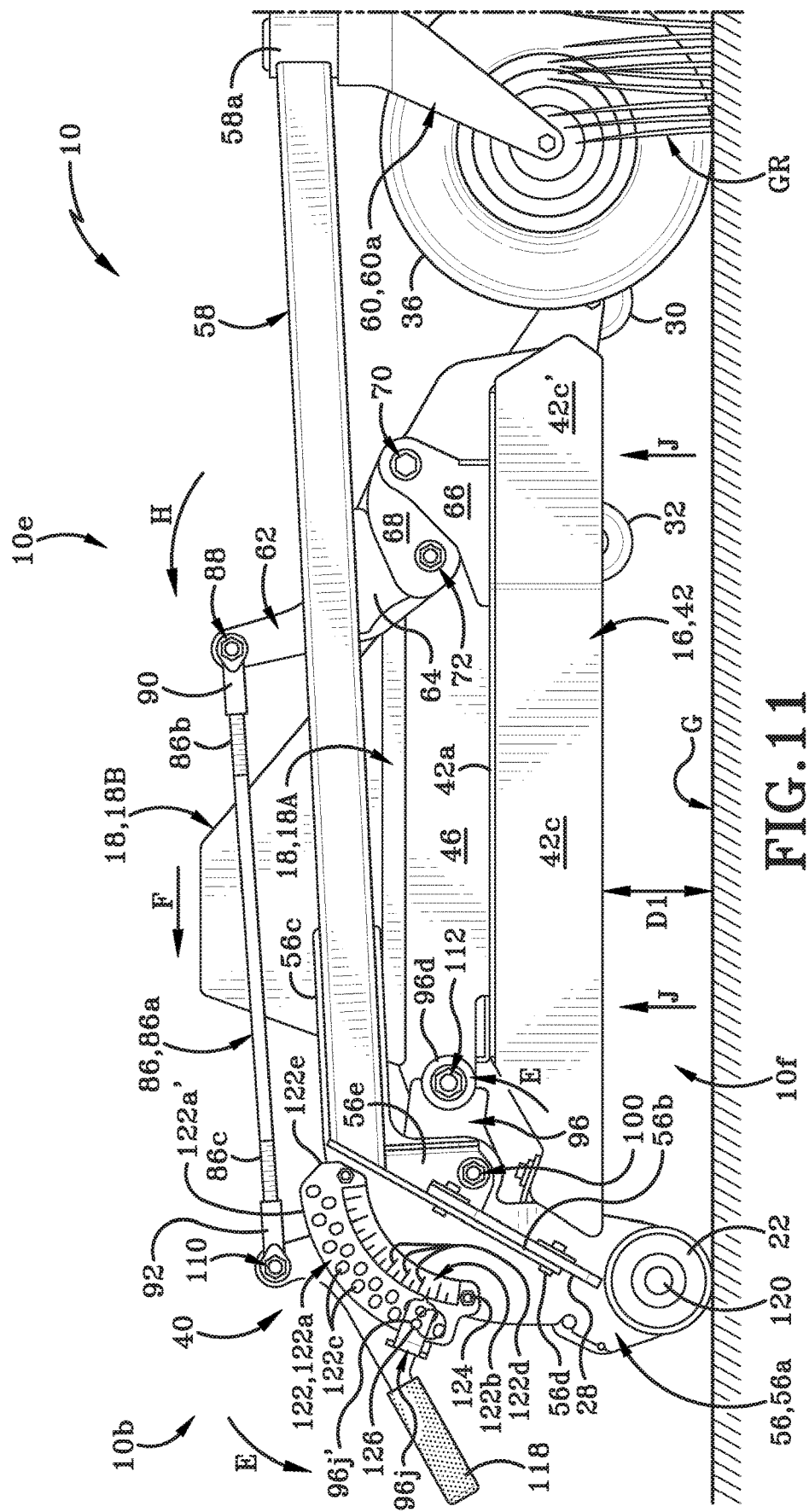
FIG. 11 is a right side elevation of the mower deck assembly showing the height adjustment mechanism in action raising the mower deck off the terrain.

Because rocker plate 96 is connected to adjustment rod 86 by fourth connector assembly 110, when rocker plate 96 pivots about fifth connector assembly 112 in the direction of arrow "E", adjustment rod 86 is caused to move rearwardly as indicated by the arrow "F" (FIG. 11). Because adjustment rod 86 is connected to front plate 62 by second connector assembly 88, rearward movement of adjustment rod 86 in the direction "F" causes the upper end of front plate 62 to pivot counterclockwise as indicated by arrow "H". The motion of front plate 62 simultaneously causes rotational plate 68 to pivot in the direction "H". Furthermore, because both the front plate 62 and rotational plate 68 are engaged with mounting plate 66 by fastener assembly 70, as front plate 62 and rotational plate 68 rotate counterclockwise, mounting plate 66 and a front end of rib 46, and thereby the front end of mower deck 16, are drawn upwardly. This upward motion of the front end of mower deck 16 is indicated by the arrow "J". Simultaneously, because of the upward movement of rib 46 and the counterclockwise rotation of rocker plate 96 in the direction "E", a rear end of rib 46 and thereby a rear end of mower deck 16 are lifted upwardly in the direction indicated by the arrow "J". After the simultaneous lifting of both the front end and the rear end of mower deck 16, the bottom of mower deck 16 is located a height "D1" from terrain "G". Because the selected hole 122d in adjustment plate 122 with which locking pin 126 is engaged is located at the greatest distance rearwardly from leading edge 122e thereof, it will be understood that FIG. 11 shows the greatest height "D1" to which mower deck 16 may be raised relative to terrain "G".

It will be understood that when the operator wishes to lower mower deck 16 closer to the terrain "G" from the position "D1" shown in FIG. 11, locking pin 126 will be removed from its engagement with adjustment plate 122 and handle 118 will be moved in a clockwise direction, i.e., opposite to arrow "E". The handle 118 will be lifted and rotated in this manner until the desired hole 122d in adjustment plate 122 is aligned with the apertures 96j' and 96h on rocker plate 96. Locking pin 126 is then reengaged to lock rocker plate 96 in that particular orientation. The rotation of rocker plate 96 in the clockwise direction moves adjustment rod 86 forwardly in the opposite direction to that indicated by arrow "F". Forward movement of adjustment rod 86 causes clockwise rotation of front plate 62 and thereby of rotation plate in a direction opposite to arrow "H". Simultaneous rotation of front plate 62 and rotation plate 68 causes mounting plate 66 and rib 46 to be lowered toward terrain "G". Because of the simultaneous lowering of the rib 46 and clockwise rotation of rocker plate 96, the rear end of mower deck 16 will be lowered in unison with the front end of mower deck 16. This downward movement is in the direction opposite to that indicated by arrow "J".

If handle 118 is moved upwardly in the opposite direction to arrow 'E' so that rocker plate 96 rotates until apertures 96j' and 96h align with a particular hole 122d on adjustment plate 112 closest to leading edge 122e, the mower deck 16 will be moved to its lowermost height relative to terrain "G". That lowermost height will be less than the height "D" indicated in FIG. 2. The operator is thus able to select which of the plurality of holes 122*d* to align setter plate 96*j* with based on the graduated height markings 122*d* provided on the scale 122*b*. Alternatively, the operator is able to select the hole 122*d* by visually selecting the observed physical height of mower deck 16 relative to the terrain "G" and then inserting the locking pin 126 with whatever hole 122*d* happens to be aligned with the apertures 96*j'* and 96*h*.

It should be noted that both of the first assemblies of the adjustment mechanism 40 need to be adjusted. Furthermore, it should be noted is not just the front end of the mower deck 16 that gets raised or lowered when handle 118 is manipulated. Instead, the entire side of the mower deck 16 from a front end thereof to a rear end thereof is raised or lowered simultaneously. It is possible for the operator to raise or lower only the right hand side of the mower deck 16 or the left hand side of the mower deck 16 by only adjusting one of the first assembly 40A and the second assembly 40B. When uniform height of the mower deck 16 is desired from the right hand side to the left hand side thereof, then the first assembly 40A and the second assembly 40B need to be set so that the handles 118 thereof are located at identical positions.

Figure 14A:
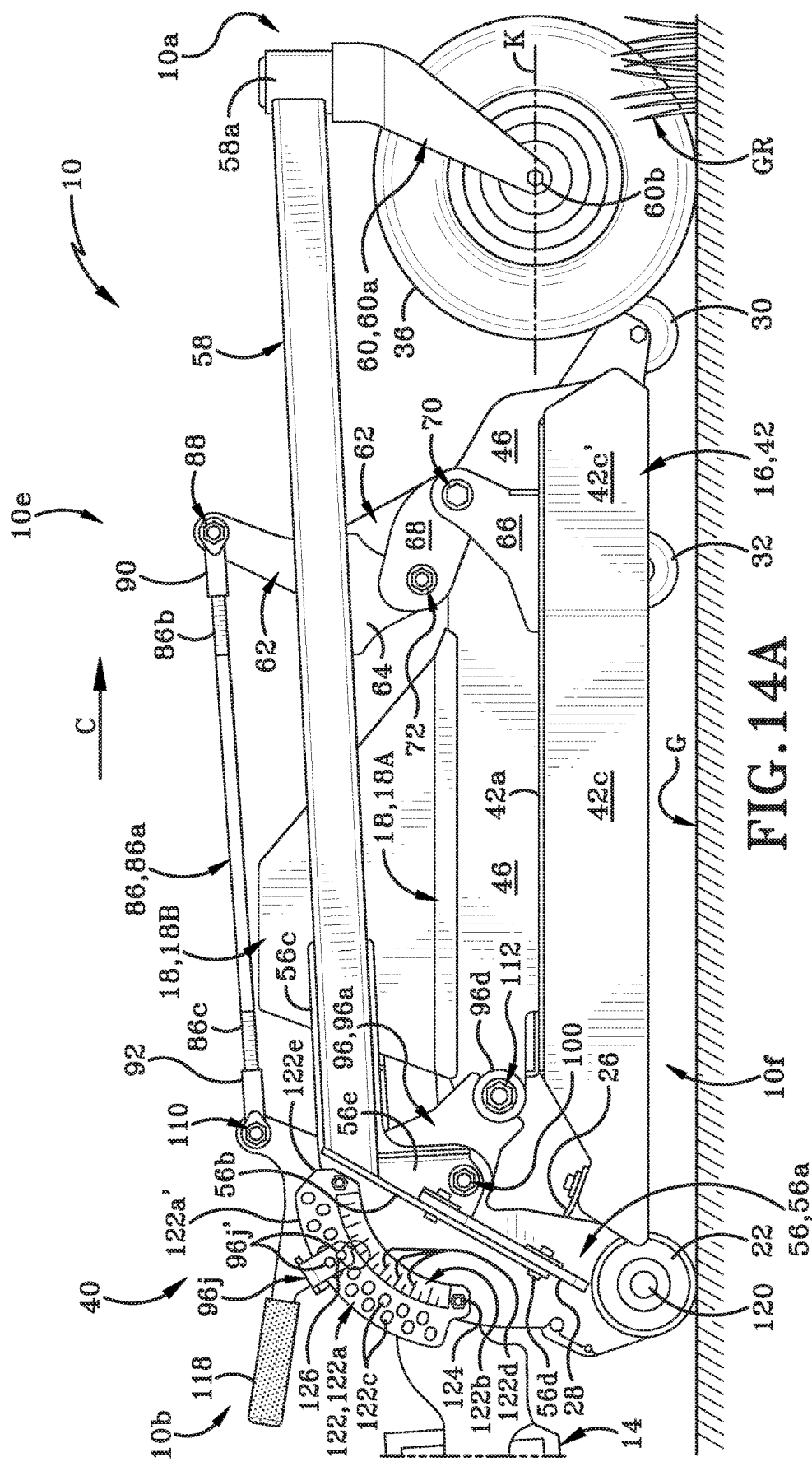
FIG. 14A is a right side elevation view of the mower deck assembly traveling across substantially level terrain.
Figure 14B:
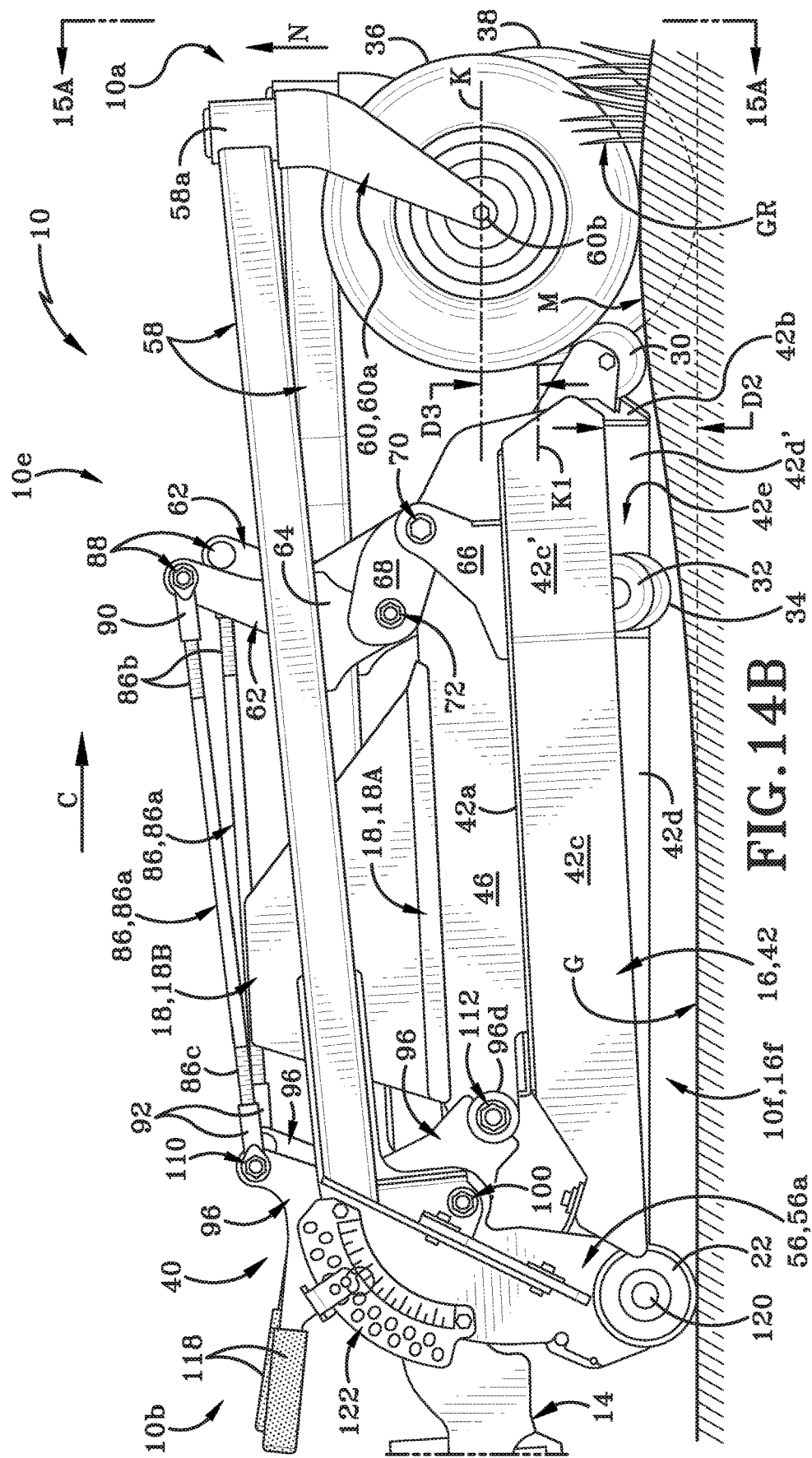
FIG. 14B is a right side elevation view of the mower deck assembly showing the positioning of the mower deck as the right side of the assembly travels over a bump while the left side of the assembly travels across level terrain.
Figure 14C:
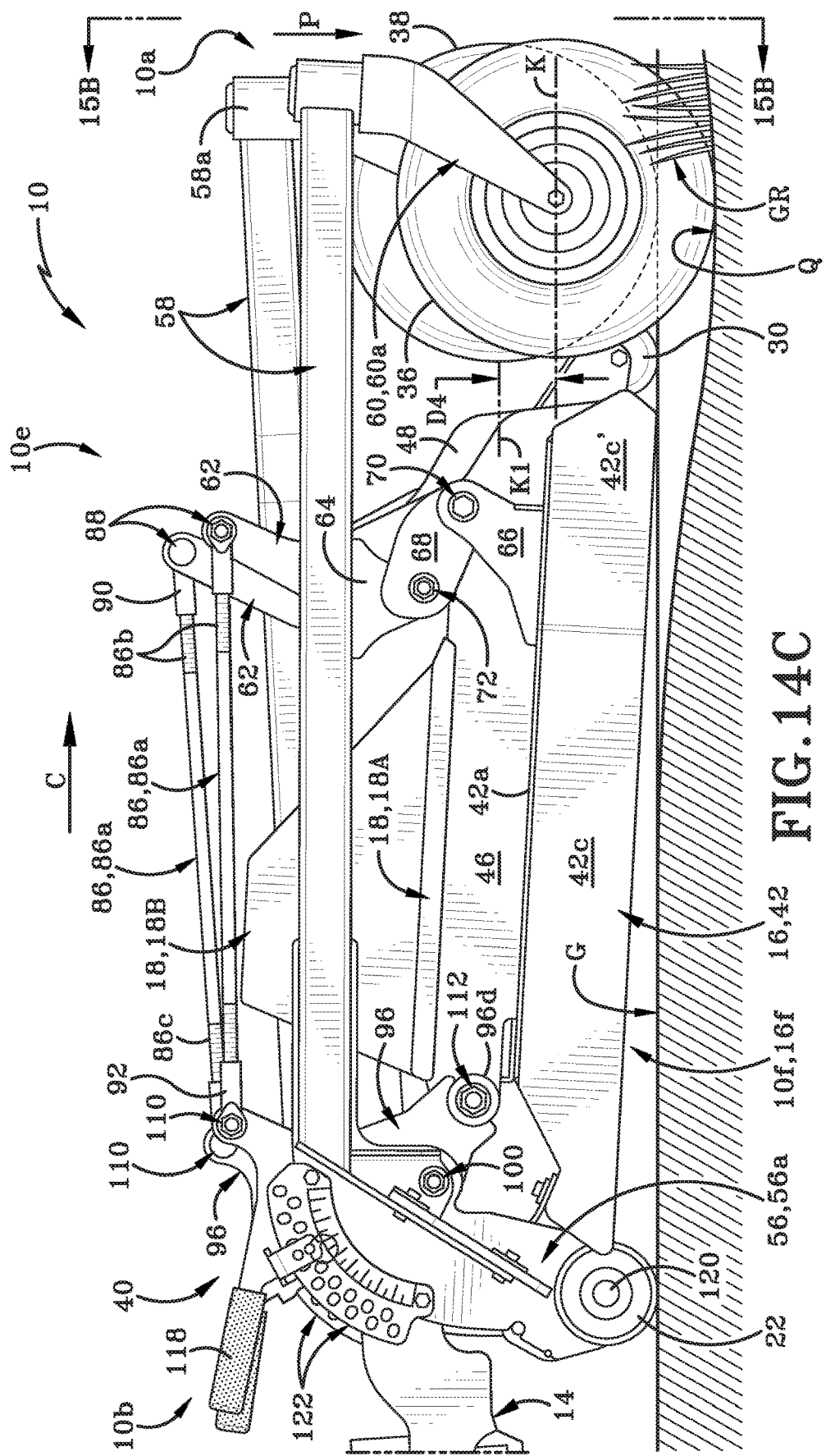
FIG. 14C is a right side elevation view of the mower deck assembly showing the positioning of the mower deck as the right side of the assembly travels over a depression in the terrain while the left side of the assembly travels across level terrain.

Referring now to FIGS. 14A through 15B, mower 10 is configured to be able to traverse over an area of terrain "G" that is substantially flat, as in FIG. 14A, has small raised bumps in certain areas, such as in FIGS. 14B and 15A, or has small depressions in certain areas, such as in FIGS. 14C and 15B.

FIG. 14A shows mower 10 moving forwardly in the direction indicated by arrow "C" over substantially flat terrain "G". Because the terrain is substantially flat, the axles 60*b* about which each of the front wheels 36 rotate, are horizontally aligned (or collinear) with each other. FIG. 14A shows a plane "K" along which the axle 60*b* of right front wheel 36 is aligned. The plane "K" is substantially parallel to the top wall 42*a* of body 42 of mower deck 16. The axle of left front wheel 38 (not shown in this figure) will also be aligned along the plane "K". It will be understood that, similar to FIG. 2, the entire bottom end of mower deck 16 is located a distance "D" away from the terrain "G".

FIG. 14B and FIG. 15A show a scenario where the right front wheel 36 is traveling over a small bump "M" in the terrain "G". The right front corner of body 42 is shown as being lifted upwardly, in the direction indicated by arrow "N", and away from the generally flat terrain "G" because the right front corner of body 42 is following wheel 36 over bump "M". The left front wheel 38, on the other hand, is still traveling across generally flat terrain "G" as are swipe roller 20, right side roller 22, and left side roller 24. Consequently, the bottom end of the mower deck 16 on the left side of body 42 and the rear end of the body, including the right rear corner of the body 42, and rollers 20, 22, and 24, are all still located the distance "D" from the terrain "G". The right front corner of body 42, on the other hand, has effectively been raised to a height "D2" relative to generally flat terrain "G". FIG. 14B shows the plane "K" in which the axle 60*b* of the right front wheel 36 is located and also shows the plane "K1" in which the axle (not visible) of the left front wheel 38 is located. The axles 60*b* of right front wheel 36 and left front wheel 38 are clearly no longer collinear. Instead, the plane "K" is located vertically above the plane "K1" and is spaced a distance "D3" therefrom. The distance "D3" is substantially equal to the height of the bump "M" relative to the flat terrain "G".

Thus, only the right front corner of mower 10 rises upwardly as mower 10 moves forwardly over bump "M" while the rest of the body 42 remains at generally the same distance away from the flat terrain "G". A lateral axis "X" is shown aligned along the axle 60*b* of left front wheel 38 (FIG. 15A). The wide body of mower 10 moving towards the right front corner tends to flex, bend, and/or twist upwardly in the direction indicated by arrow "N" to accommodate the fact that some parts of the mower deck 16 remain in the same position relative to terrain "G" shown in FIG. 14A but other parts of the mower deck 16 have lifted upwardly away from the terrain "G".

The lifting of the right front corner of mower deck 16 is also seen in other components on mower 10. Referring again to FIG. 14B, it can be seen that carrier frame 58 associated with right front wheel 36 moves upwardly in the direction "N' relative to the carrier frame 58 associated with left front wheel 38. Similarly, the adjustment rod 86 associated with right front wheel 36 of mower 10 tends to become vertically raised relative to the adjustment rod 86 associated with the left front wheel 38. Additionally, the handles 118 associated with the right front wheel 36 and left front wheel shift vertically with respect to each other. Because the first end 86*b* of adjustment rod 86 gets raised as wheel 36 moves over bump "M", the handle 118 on the right side of mower 10 tends to drop slightly downwardly relative to the handle 118 on the left side of mower 10. It should be noted that this downward movement of the handle 118 has nothing to do with the adjustment mechanism 40. The mower 10 remains set at the previously set cutting height.

FIGS. 14C and 15B show a situation where the right front wheel 36 travels downwardly in a direction indicated by arrow "P" into a depression "Q" in terrain "G". The left front wheel 38 and the rollers 20, 22, 24 continue to travel in the direction "C" along substantially flat terrain "G". Because right front wheel 36 travels downwardly into depression "P", the right front corner of body 42 drops downwardly toward the level of the terrain "G" in the direction indicated by arrow "R". This motion causes the distance between the bottom of the right front corner of body 42 to decrease below the distance "D". FIG. 15B shows that the right front roller 32 contacts the terrain "G" and the central front roller 30 partially contacts the terrain. Left front roller 34 remains a distance above the terrain "G". The contact between right front roller 32 and the terrain "G" helps to ensure that the mower blades 54 are maintained at least a minimum distance away from the terrain "G". This arrangement helps to ensure that the mower blades 54 will not scalp the grass.

Additionally, FIG. 14C shows that the plane "K" with which the axle 60*b* of right front wheel 36 is aligned moves vertically downwardly relative to the plane "K1" in which the axle of the left front wheel 38 is aligned. Because of this, the plane "K" is located a distance "D4" from plane 'K1'. While the right front corner of the mower deck 16 moves downwardly because it is following the right front wheel 36 into the depression "Q", the rest of mower deck 16 continues travelling at generally the distance "D" away from the terrain "G". The wide body of mower 10 moving towards the right front corner tends to flex, bend, and/or twist downwardly in the direction indicated by arrow "P" to accommodate the fact that some parts of the mower deck 16 remain in the same position relative to terrain "G" shown in FIG. 14A but other parts of the mower deck 16 have dropped downwardly towards the terrain "G". Because right front roller 32 and parts of central roller come into contact with the terrain "G', some of the twisting, bending and flexing of the mower deck 16 minimized or is limited by the rollers 32 and 30.

FIG. 14C also shows that the carrier frame 58 associated with right front wheel 36 drops to a relative vertical position below the carrier frame 58 associated with left front wheel 38. Similarly, the adjustment rod 86 associated with right front wheel 36 of mower 10 tends to drop vertically relative to the adjustment rod 86 associated with the left front wheel 38. Additionally, the handles 118 associated with the right front wheel 36 and left front wheel 38 shift vertically with respect to each other. Because the first end 86b of adjustment rod 86 drops as wheel 36 moves through depression "P", the handle 118 on the right side of mower 10 tends to move slightly upwardly relative to the handle 118 on the left side of mower 10. It should be noted that this upward movement of the handle 118 has nothing to do with the adjustment mechanism 40. The mower 10 remains set at the previously set cutting height.

When right front wheel 36 has traveled downwardly over the entire bump "M" shown in FIG. 14B or upwardly out of the depression "P" shown in FIG. 14C, the mower deck 16 will tend to flex, bend or twist in the opposite direction and return to the position shown in FIG. 14A. However, immediately after this, the right rear corner of mower deck 16 will travels upwardly over the same bump "M" or downwardly into the depression "P". In a somewhat similar fashion, the mower deck 16 will flex, twist, or bend slightly to accommodate the differences in the terrain "G". The axle 120 and striping roller 20, may flex, twist, or bend slightly to accommodate the bump "M" or depression "P". It will be understood, however that any flexing, twisting, or bending motion of the mower deck 16, axle 120, and striping roller 20 will be substantially less than the motion of the mower deck 16 when right front corner of mower deck 16 encounters such terrain. It will further be understood that the right front wheel 36 might go over a bump "M" while the left front wheel 38 goes through a depression "P" or vice versa. The flexible, open-box, wide-bodied frame of body 42 helps the mower 10 to undergo variable loading due to twisting (torsion), flexing, and/or bending caused by traveling over uneven terrain "G". As indicated above, the configuration of the various components of mower deck 16 help mower deck 16 to tend to recover and return to its "at rest" position when the terrain flattens out again. The central roller 30, right side roller 32 and left side roller 34 may periodically contact the terrain "G" to help ensure that at least a basic minimum distance between the mower blades 54 on the mower deck 16 and the grass on the terrain "G" is maintained so that the mower blades 54 will tend not to scalp the terrain, regardless of the terrain.

While FIG. 1 shows mower 10 in front of tractor 12 and therefore pushed in front of tractor 12, it will be understood that in other embodiments, mower 10 may be positioned behind tractor 12 and may be towed thereby.

While the above description has indicated that mower 10 includes a translation assembly comprised of striping roller 20, right side roller 22, and left side roller 24, it will be understood that in other embodiments, one or more of these rollers may be replaced with wheels. The wheels may be fixed axle wheels or caster wheels similar to wheels 36 and 38.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "element A and/or element B", when used in conjunction with open-ended language such as "comprising" can refer, in one embodiment, to element A only (optionally including elements other than element B); in another embodiment, to element B only (optionally including elements other than element A); in yet another embodiment, to both element A and element B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A mower comprising:
   a single unarticulated mower deck;
   a right front wheel and left front wheel operatively engaged with the mower deck; and
   one or more mower blades positioned for rotation below the mower deck;
   wherein the mower deck is of an open-box structure that is not substantially rigid, the open-box structure comprising a top wall with a at least one strengthening member, wherein the at least one strengthening member is configured to enable the mower deck to twist, flex, or bend when terrain over which the mower is traveling is uneven.

2. The mower according to claim 1, wherein the open-box structure of the mower deck further comprises:
   a lower surface, a first end, a second end, a first edge, and a second edge;
   and wherein the at least one strengthening member comprises at least one bar extending transversely across a top surface of the top wall in a direction from the first edge to the second edge.

3. The mower according to claim 2, wherein the at least one bar comprises only a single plate.

4. The mower according to claim 3, wherein the single plate is formed into an L-shape.

5. The mower according to claim 2, wherein the at least one bar extends upwardly from the top surface of the top wall.

6. The mower according to claim 2, wherein the at least one strengthening member further comprises at least one rib extending longitudinally across the top surface of the top wall in a direction from the first end to the second end.

7. The mower according to claim 6, wherein the at least one rib comprises a single plate.

8. The mower according to claim 6, wherein the at least one rib extends upwardly from the top surface of the top wall.

9. The mower according to claim 2, wherein the open-box structure of the mower deck further comprises at least one side wall extending longitudinally along the lower surface of the top wall in a direction from the first end to the second end.

10. The mower according to claim 9, wherein the at least one side wall is a single plate.

11. The mower according to claim 10, wherein the at least one side wall extends downwardly from the lower surface of the top wall.

12. The mower according to claim 9, wherein the open-box structure of the mower deck further comprises a front wall extending transversely along the lower surface of the top wall in a direction from the first edge to the second edge.

13. The mower according to claim 12, wherein the at least one side wall includes a left side wall and a right side wall, and the front wall extends between front ends of the left side wall and the right side wall, and wherein the mower deck is free of any walls extending between rear ends of the left side wall and the right side wall.

14. The mower according to claim 1, further comprising at least one anti-scalping roller mounted to the mower deck and extending downwardly from a lower surface of a top wall thereof, and wherein the at least one anti-scalping roller is adapted to only contact the terrain over which the mower travels when the mower deck twists, flexes, or bends downwardly toward the terrain.

15. The mower according to claim 1, wherein a width of the mower deck from a right side thereof to a left side thereof is from about 72 inches up to about 120 inches.

16. A method of mowing an area of grass comprising:
   providing a mower that has a single unarticulated mower deck, that is not substantially rigid, of an open-box structure comprising a top wall with at least one strengthening member;
   moving the mower deck across the area of grass to be mowed;
   cutting the grass with rotating mower blades mounted beneath a top wall of the mower deck;
   wherein the at least one strengthening member is configured to enable flexing, twisting, or bending the mower deck when one of a pair of front wheels engaged with the mower deck travels over uneven terrain.

17. The method according to claim 16, wherein the pair of wheels comprises a right front wheel and a left front wheel, and the method includes:
   rotating each of the right front wheel and left front wheel about an axle;
   maintaining the axle of the right front wheel and the axle of the left front wheel in a first plane when the mower travels over generally flat terrain; and
   moving the axle of one of the right front wheel and the left front wheel into a second plane when one of the right front wheel and the left front wheel travels over uneven terrain.

18. The method according to claim 16, further comprising:
   providing at least a pair of anti-scalping rollers on the mower deck; and
   contacting the terrain with at least one of the pair of anti-scalping rollers when traveling through a depression in the terrain.

19. The method according to claim 18, further comprising:
   maintaining the rotating mower blades a minimum distance above the terrain when the at least one of the pair of anti-scalping rollers contacts the terrain; and
   reducing a tendency of the rotating mower blades to scalp the grass.

* * * * *